US012611892B2

(12) United States Patent
Molozis

(10) Patent No.: US 12,611,892 B2
(45) Date of Patent: Apr. 28, 2026

(54) FORM-FIT ADJUSTMENT DEVICE FOR A CASTER

(71) Applicant: TENTE GmbH & Co. KG, Wermelskirchen (DE)

(72) Inventor: Athanasios Molozis, Dortmund (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 18/835,432

(22) PCT Filed: Feb. 15, 2023

(86) PCT No.: PCT/EP2023/053687
§ 371 (c)(1),
(2) Date: Aug. 2, 2024

(87) PCT Pub. No.: WO2023/156415
PCT Pub. Date: Aug. 24, 2023

(65) Prior Publication Data
US 2025/0153507 A1 May 15, 2025

(30) Foreign Application Priority Data
Feb. 17, 2022 (DE) ..................... 10 2022 103 797.5

(51) Int. Cl.
B60B 33/00 (2006.01)

(52) U.S. Cl.
CPC .................................. B60B 33/0086 (2013.01)

(58) Field of Classification Search
CPC ............ B60B 33/0028; B60B 33/0055; B60B 33/0094; B60B 33/0039; B60B 33/0049;
(Continued)

(56) References Cited

U.S. PATENT DOCUMENTS 5,133,106 A     7/1992 Milbredt et al.
9,139,043 B1 *  9/2015 Fan ..................... B60B 33/0047
(Continued)

FOREIGN PATENT DOCUMENTS

CN        101219630 B  *  6/2010
CN        101535057 B  *  12/2012
(Continued)

OTHER PUBLICATIONS

International Search Report in PCT/EP2023/053687, mailed May 23, 2023.

*Primary Examiner* — Chuck Y Mah
(74) *Attorney, Agent, or Firm* — Collard & Roe, P.C.

(57) ABSTRACT

A formfitting securing apparatus for a caster includes a running wheel, a fork and a rotation-blocking engagement part, for rotationally blocking the running wheel of the caster with respect to a geometric impeller wheel axis. A first spring also acts on the rotation-blocking engagement part in order to move it from an initial position into an engagement position. The first spring is formed by a lever arm of a lever part, a second spring can, with the movement of the rotation-blocking engagement part into the engagement position, be tensioned for the return movement back into the initial position, and the first spring is stronger than the second spring. Furthermore, a fork-shaped ram part can have ram extensions of different lengths, with only one ram extension being arranged to act on the lever part.

17 Claims, 19 Drawing Sheets

(58) Field of Classification Search
CPC ............ B60B 33/0057; B60B 33/0068; B60B
33/0081; B60B 33/0084; B60B 33/0092;
B60B 33/025; B60B 33/021; B60B
33/023; B60B 33/0042; B60B 33/0073;
B60B 33/0078; B60B 33/0086; B60B
37/10; B60B 2200/222; B60B 2200/24;
B60B 2200/242; B60B 2900/531; F16D
49/00; F16D 65/42; F16D 2121/14; F16D
2125/32
See application file for complete search history.

(56) References Cited

U.S. PATENT DOCUMENTS

| 9,481,206 | B2 * | 11/2016 | Block | ..................... B60B 33/02 |
| 10,905,612 | B2 * | 2/2021 | Derenne | .................. A61G 7/08 |
| 11,065,913 | B2 | 7/2021 | Molozis | |
| 2009/0113671 | A1 | 5/2009 | Chu | |
| 2014/0101891 | A1 | 4/2014 | Hofrichter et al. | |
| 2014/0109342 | A1 | 4/2014 | Hofrichter et al. | |
| 2019/0358998 | A1 * | 11/2019 | Patmore | ................. F16D 49/00 |

FOREIGN PATENT DOCUMENTS

| CN | 206544435 U | * | 10/2017 | |
| DE | 89 15 173 U1 | | 4/1991 | |
| DE | 102009043825 A1 | * | 5/2010 | ......... B60B 33/0081 |
| DE | 10 2014 113 460 A1 | | 3/2016 | |
| DE | 20 2017 100 939 U1 | | 4/2017 | |
| JP | H07266803 A | * | 10/1995 | |
| WO | 2006/040234 A2 | | 4/2006 | |
| WO | 2008/148169 A1 | | 12/2008 | |
| WO | 2012/171816 A1 | | 12/2012 | |
| WO | 2019/053004 A1 | | 3/2019 | |

* cited by examiner

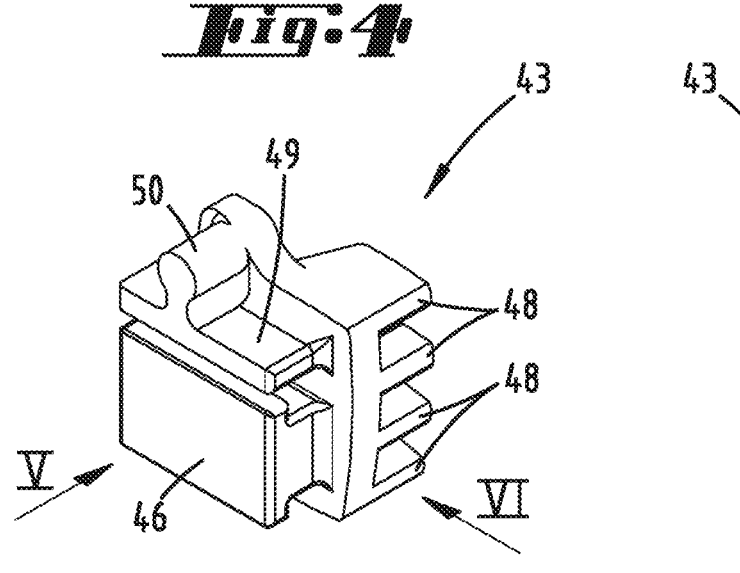
*Fig·4*
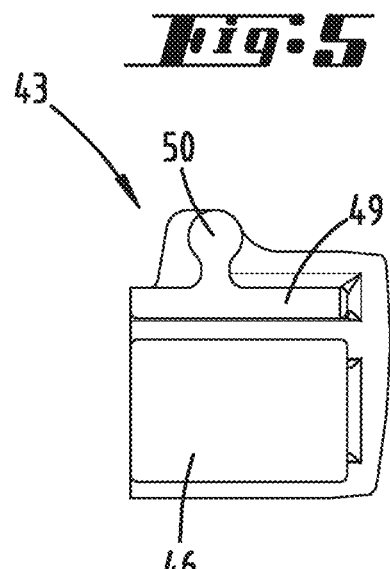
*Fig·5*
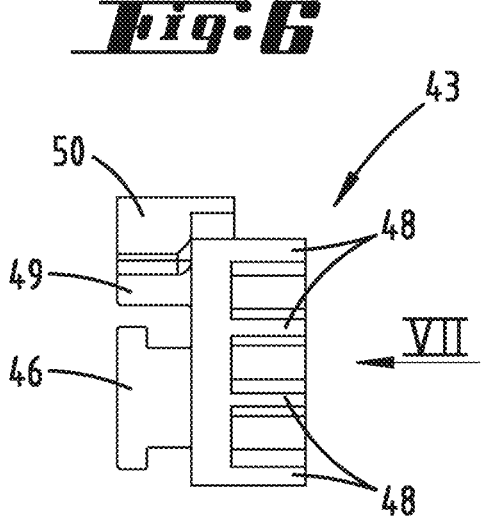
*Fig·6*
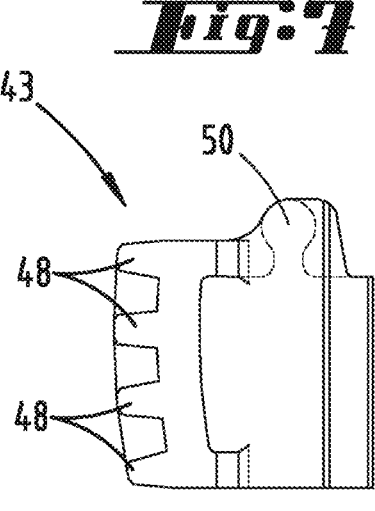
*Fig·7*

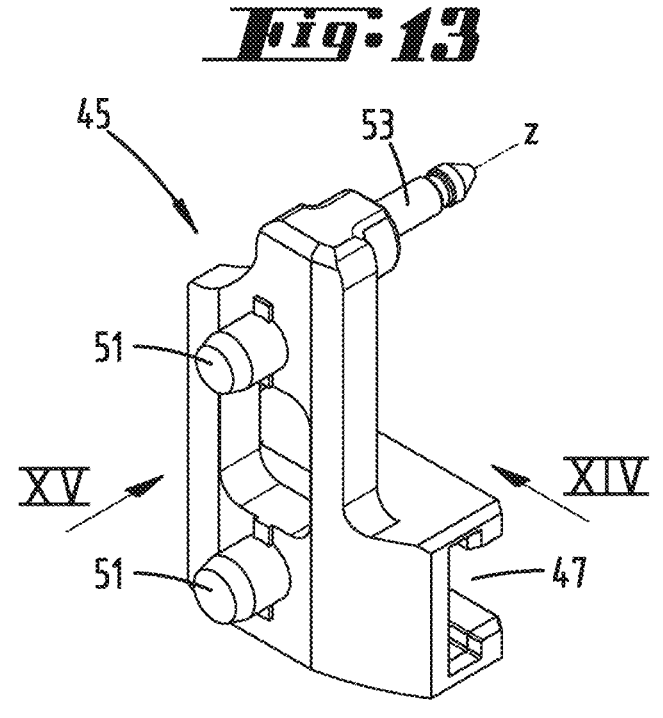
*Fig. 13*
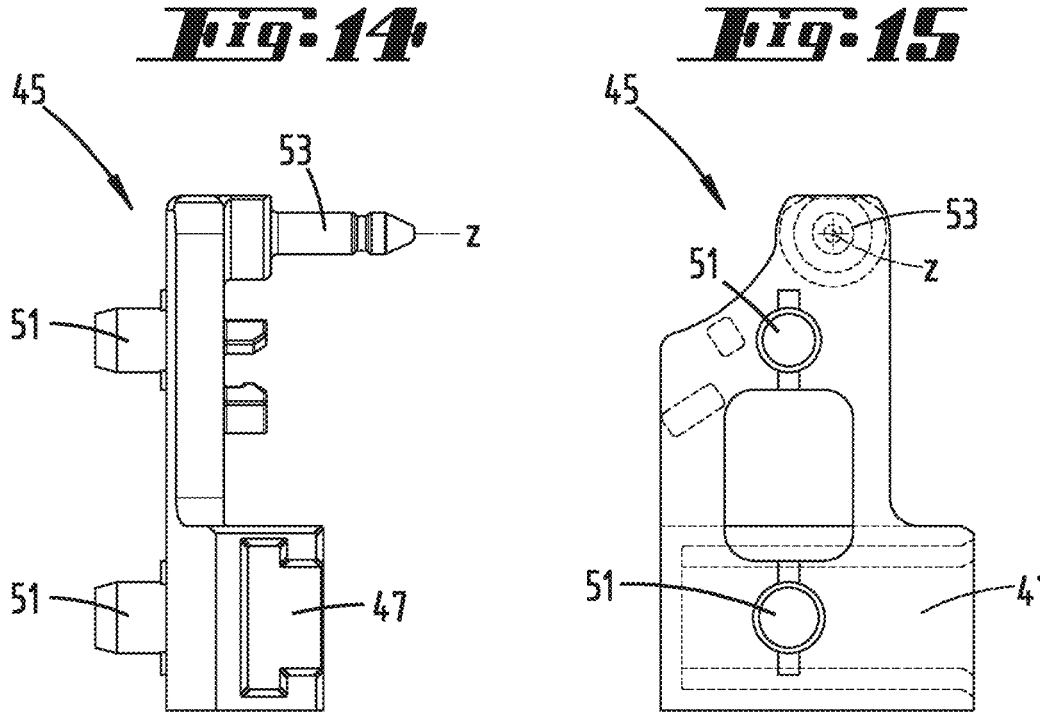
*Fig. 14*       *Fig. 15*

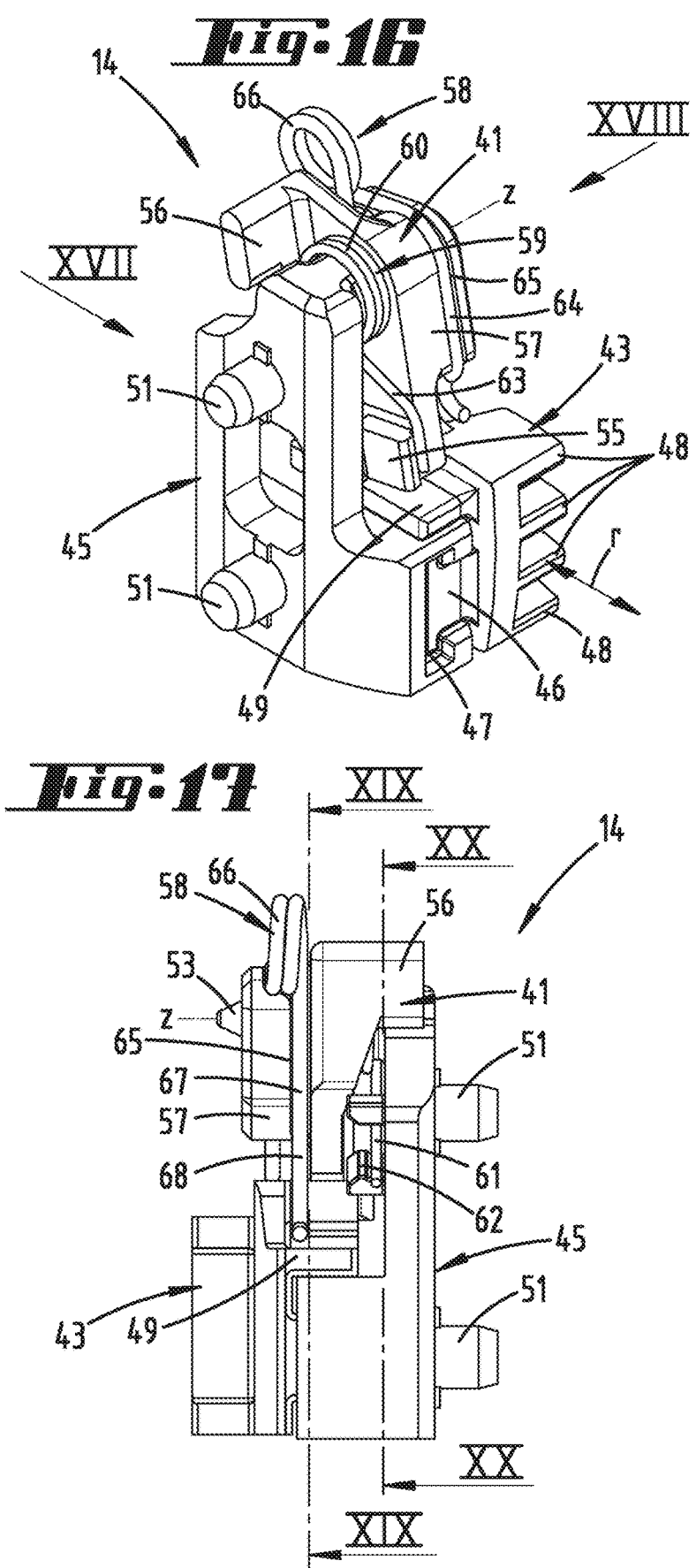

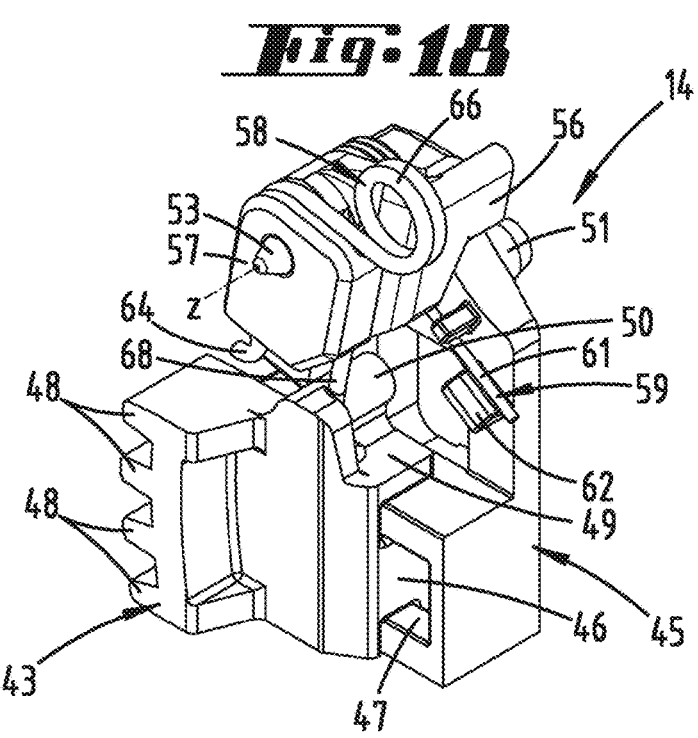
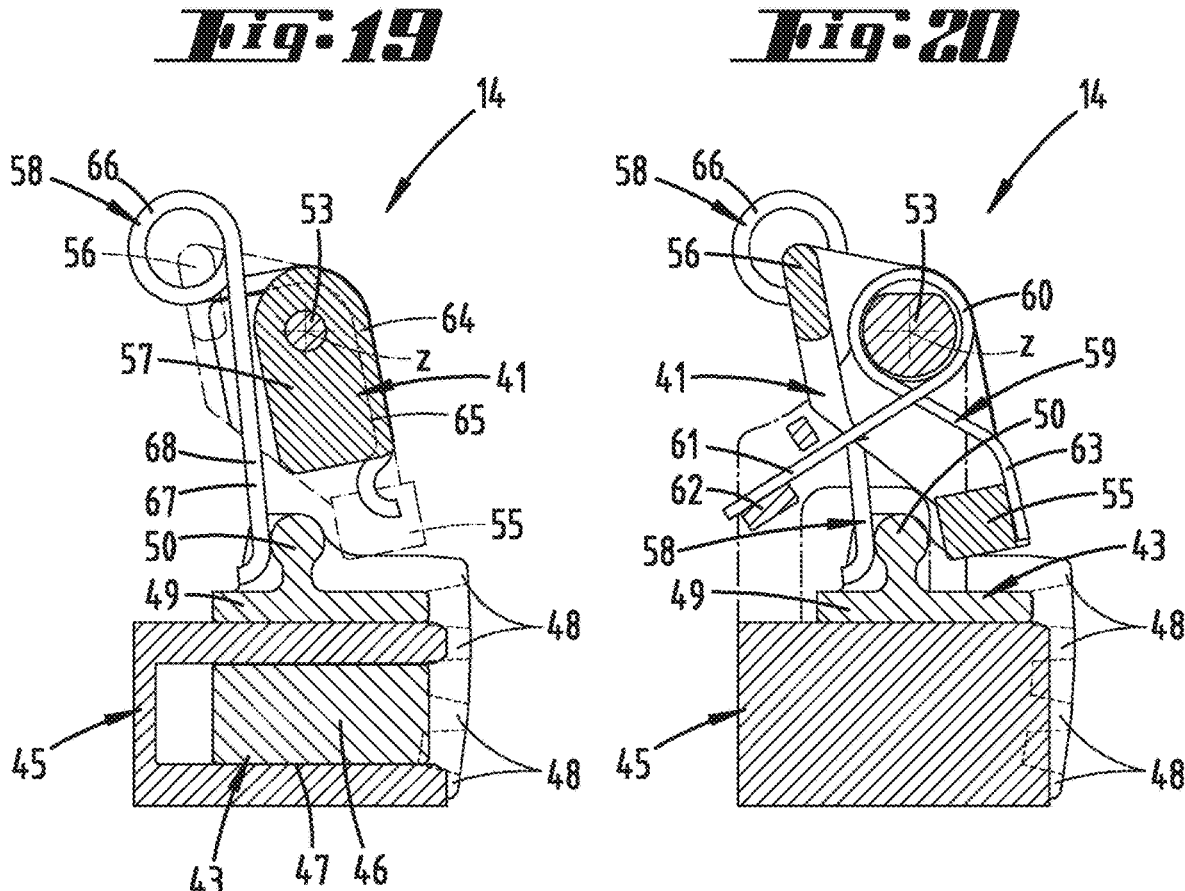

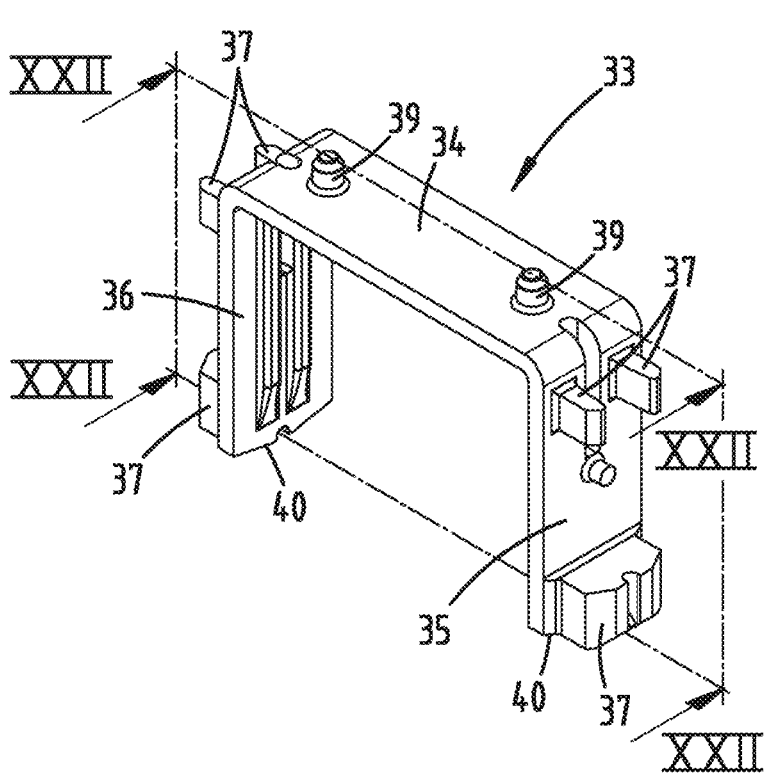
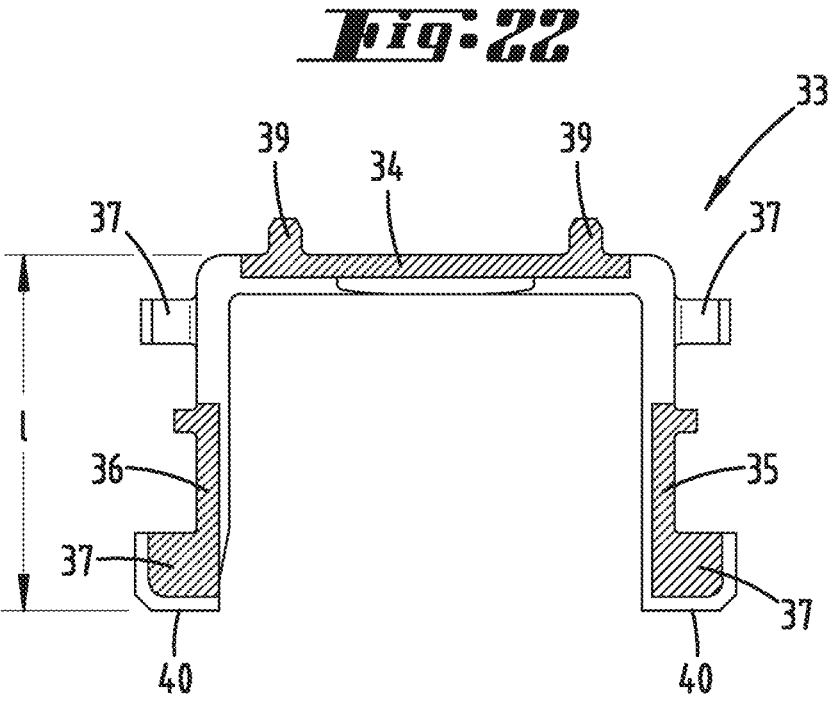

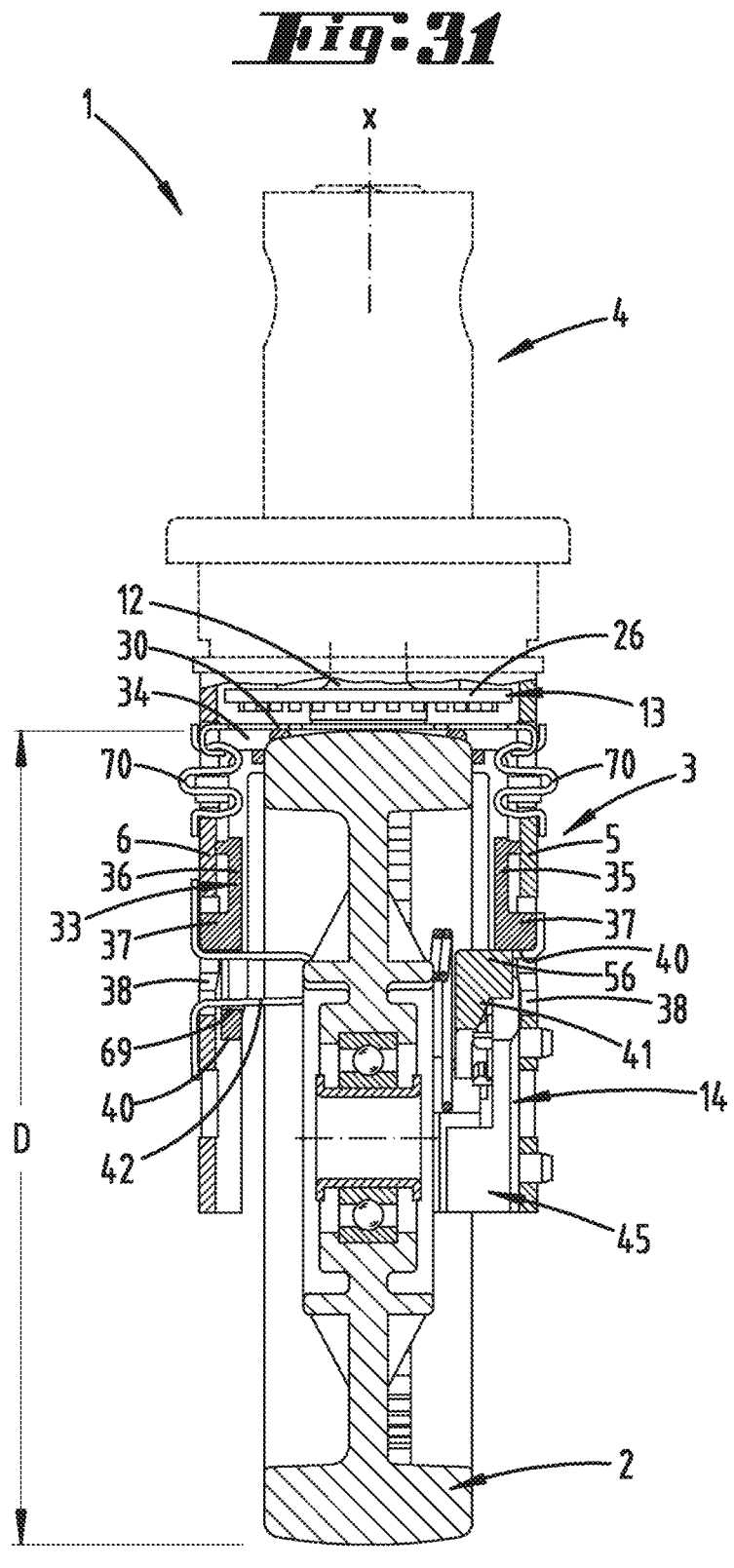
_Fig. 31_

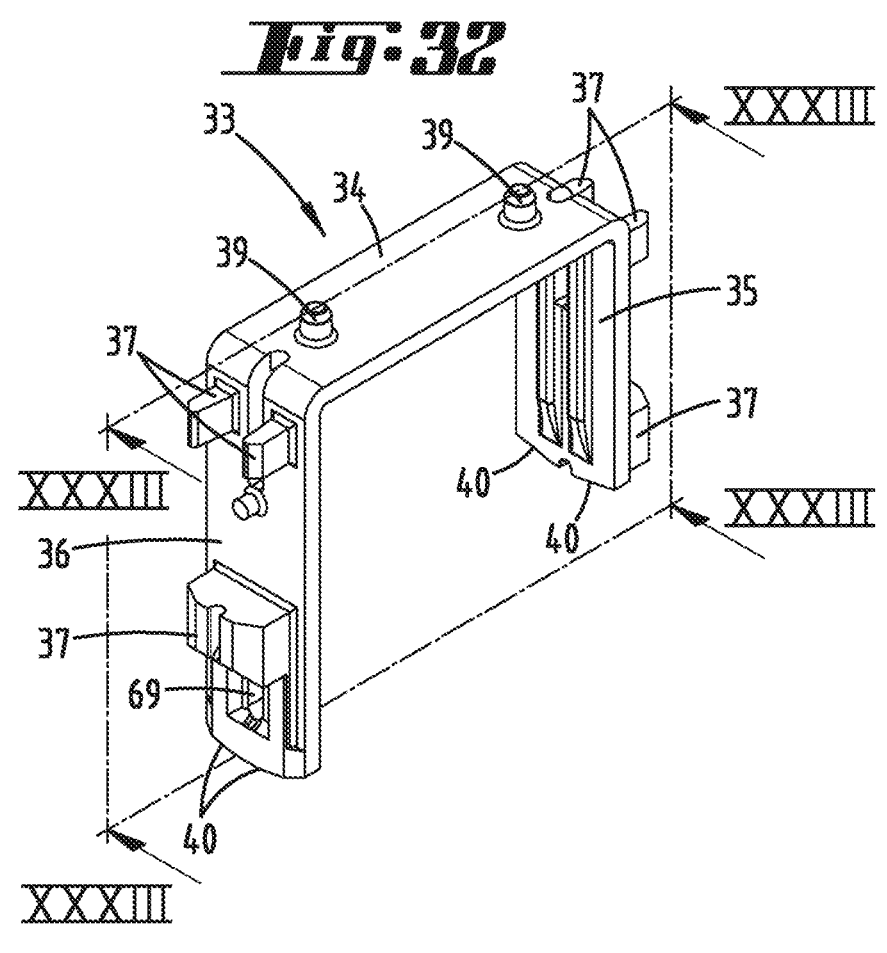
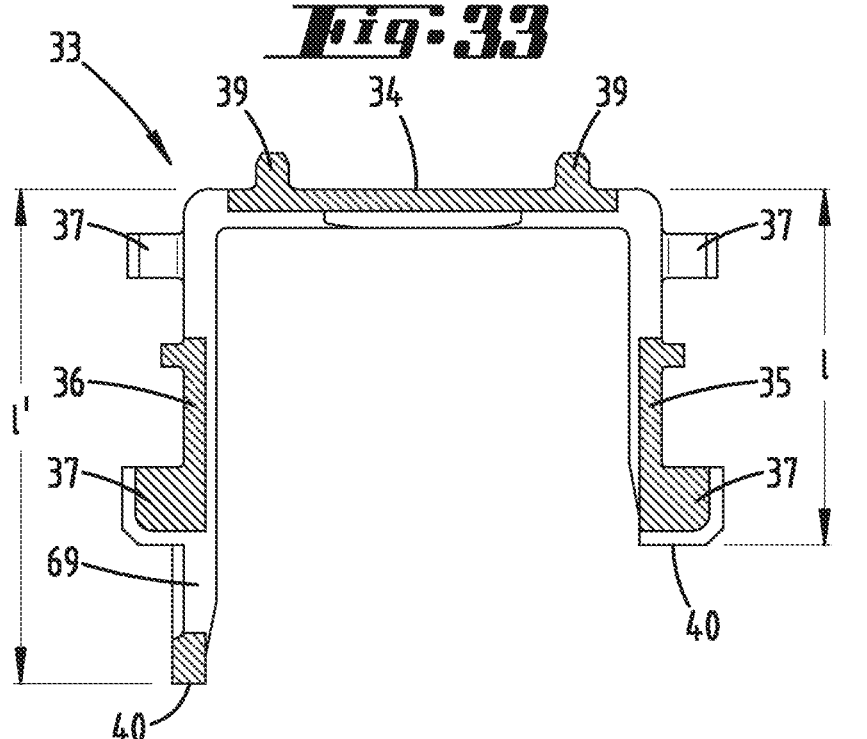

FORM-FIT ADJUSTMENT DEVICE FOR A CASTER

CROSS REFERENCE TO RELATED APPLICATIONS

This application is the National Stage of PCT/EP2023/053687 filed on Feb. 15, 2023, which claims priority under 35 U.S.C. § 119 of German Application No. 10 2022 103 797.5 filed on Feb. 17, 2022, the disclosure of which is incorporated by reference. The international application under PCT article 21(2) was not published in English.

FIELD OF TECHNOLOGY

The invention relates to a form-fit locking device for a caster, with a running wheel, a fork and a rotation blocking engagement part, wherein the running wheel of the caster may be rotationally blocked in relation to a geometric running wheel axis via the form-fit locking device, wherein additionally a first spring acts on the rotation blocking engagement part to displace the rotation blocking engagement part from a starting position into an engagement position.

The invention also relates to a form-fit locking device for a caster, with a running wheel, a fork and a rotation blocking engagement part, wherein the running wheel of the caster may be rotationally blocked in relation to a geometric running wheel axis via the form-fit locking device, wherein additionally the rotation blocking engagement part may be actuated via a lever part for displacing the rotation blocking engagement part from a starting position into an engagement position and/or from the engagement position into the starting position, wherein additionally the lever part is actuatable by means of a tappet part.

PRIOR ART

Form-fit locking devices of the type in question are known, especially for casters having a running wheel and a fork, additionally a mounting pin, if applicable. The running wheel of the caster may be rotationally blocked with respect to the geometric running wheel axis via the form-fit locking device. For this purpose, the rotation blocking engagement part, which is arranged, for example, on the fork or mounting pin side in known solutions, is in a positive locking position in an engagement position with at least one counter-engagement part on the running wheel side. In this context, it is additionally known to provide a toothing on the running wheel side, circumferential in relation to the running wheel axis, to form the counter-engagement part, into which the rotation blocking engagement part may engage to activate the form-fit locking device. It is also known in this context to load such a rotation blocking engagement part in the engagement position in a pretensioned way, yet also, if applicable, in the disengagement position, by means of a spring.

Reference is made in this context, for example, to WO 2019/053 004 A1 (U.S. Pat. No. 11,065,913 B2), from which a caster, here a steering caster, is known which, in addition to the rotational mobility of the running wheel, also has a pivoting mobility of the caster fork pivot axis, in which the rotation blocking engagement part is displaceable substantially transversely to a mounting pin axis of the caster for interacting with a gear rim of the running wheel, thus further correspondingly oriented substantially a to horizontally-oriented line in normal usage. The spring acting on the engagement part acts on the rotation blocking engagement part at least in the engagement position or in a prepared engagement position.

In addition, it is further known, for example further from the aforementioned WO 2019/053 004 A1, to act on the lever part of the form-fit locking device via a tappet part, guided, for example, in the area of the mounting pin of the caster and displaceable along a mounting pin axis, for displacing the rotation blocking engagement part from the starting position into the engagement position and/or vice versa.

A form-fit locking device for a caster is known from WO 2012/171 816 A1 (US 2014/0 109 342 A1), in which a first spring acts on a linearly movable tappet part, and the tappet part acts on a lever part, which displaces a rotation blocking engagement part into an engagement point counter to the effect of a second return spring.

In a form-fit locking device known from DE 10 2014 113 460 A1, a first spring acts against a lever part for the linear displacement of the lever part. A second spring, which is also arranged to act on the lever part, moves linearly, corresponding to the lever part, over the course of a tensioning or releasing of this spring.

Reference to the prior art is additionally made to DE 89 15 173 U1 (U.S. Pat. No. 5,133,106 A). In the form-fit locking device known herefrom, a linearly movable engagement part is provided, which may be displaced into the engagement position by a wedge gear. It is known from WO 2008/148169 A1 that a lever part forming a load and force arm may be acted on by means of a spring. It is known from DE 20 2017 100 939 U1 to act on a tappet part by means of a lever part.

SUMMARY OF THE INVENTION

With respect to the previously described prior art, in particular starting from WO 2019/053 004 A1, the invention is concerned with the task of advantageously configuring a form-fit locking device of the type in question.

In terms of the previously described prior art, in particular, starting approximately from WO 2008/148169 A1, the invention is concerned with the problem of advantageously configuring a form-fit locking device of the type in question.

According to a first idea of the invention, a possible solution to the problem is provided for a form-fit locking device, which focuses on the fact that the first spring is mounted on a pivotable lever part, that the first spring forms a lever arm, that, with the displacement of the rotation blocking engagement part into the engagement position, a second spring, mounted on the lever part, may be tensioned for the return movement into the starting position, and that the first spring is stronger than the second spring.

The rotation blocking engagement part is actuated by a lever arm, which is part of the first spring and is itself designed to be resilient, for displacement out of the starting position in the direction toward the engagement position, wherein the spring force of the first spring forming this lever arm is selected to be sufficiently large such that the second spring is tensioned by the displacement of the rotation blocking engagement part in the direction toward the engagement position. Upon the cessation of a load acting on the lever part, a return of the lever part, and preferably thereby also the rotation blocking engagement part, back into the starting position is achievable via the tensioned second spring.

During a normal actuation of the form-fit locking device, in which the rotation blocking engagement part may engage without resistance into the running wheel side counter-engagement part, the lever arm of the lever part formed from the first spring acts substantially rigidly on the rotation blocking engagement part for displacing the same. In the case of such a normal actuation, there correspondingly (initially) arises only an overcoming of the spring force of the second, weaker spring, which builds up a pretension over the course of this displacement for returning the lever part. In addition, reduced shifting forces, compared to the known prior art, advantageously result from this.

Preferably only in a situation, in which the rotation blocking engagement part is unable to immediately engage into the corresponding counter-engagement part of the running wheel, for example, in a situation in which engagement teeth of the rotation blocking engagement part collide with engagement teeth of the counter-engagement part, does the first spring, forming the lever arm, also come into operation in addition to the second spring. The spring force of the first spring thus built up causes an automatic displacement of the rotation blocking engagement part into the rotation blocking engagement position as soon as the running wheel, and thus the counter-engagement part, are additionally rotated by a few angular degrees, so that the engagement teeth of the rotation blocking engagement part may fall into the tooth valleys between the engagement teeth of the counter-engagement part.

The cited problem is also solved by a combination with the previously described solution with additional, subsequently explained embodiments, which focus on the fact that the tappet part is formed in the shape of a fork.

According to a further inventive idea, another possible solution, which is independent and significant in and of itself, but alternatively also in combination with the previously described solution, and also in terms of further, subsequently explained embodiments, is provided in the case of a form-fit locking device, which focuses on the fact that the tappet part is formed in the shape of the fork, with tappet extensions of different lengths, wherein only one tappet extension is arranged to act on the lever part.

For example, in the case of a substantially U-shaped configuration of the tappet part, the tappet extensions result forming legs of the U, oriented substantially parallel to one another, which are further connected to one another via a crossbar of the U. A subsection of the running wheel may extend between the legs of the U.

Usually, as well as preferably, the rotation blocking engagement part is linearly displaceable out of the starting position into the engagement position and back, further preferably substantially starting from the geometric running wheel axis along a horizontal line with respect to the usual use position of the caster.

The legs of the U of the tappet part forming the tappet extensions are selected to be of different lengths, starting from the connecting U crossbar, in their substantially vertical extension in the usual position of use. Therefore, in the operational arrangement position, only one of the two tappet extensions is suitably designed for acting on the lever part of the locking form-fit device. This advantageously offers the possibility of the arrangement of the tappet part in casters with different running wheel diameters, wherein, in the case of a smaller running wheel diameter, the tappet part is preferably arranged such that the shorter tappet extension is oriented to act on the lever part of the form-fit locking device, and conversely the longer tappet extension, in the case of a larger running wheel diameter, according to the corresponding arrangement of the tappet part in the caster.

In the case of a usual orientation of the caster, the tappet extensions extend substantially in the vertical direction, further preferably on both sides and along a mounting pin axis, which mounting pin axis may further preferably pass through the previously described U crossbar of the tappet part substantially in the center. By rotating the arrangement of the tappet part by 180 degrees relative to the mounting pin axis, only the shorter or only the longer tappet extension is respectively arranged to act on the lever part of the form-fit locking device.

Thus, the same components may be used, in particular related to the elements for forming the mounting pin and the elements for forming the form-fit locking device and related to the tappet part, with the exception of the fork and the running wheel, to manufacture casters with different running wheel diameters, in particular in an advantageous manufacturing technology way.

The first spring may be formed by a lever arm of the lever part, that, wherein, with the displacement of the rotation blocking engagement part into the engagement position, a second spring may be tensioned for the return movement into the starting position, and that the first is than the spring stronger second spring, wherein additionally the tappet part is formed in the shape of a fork, with tappet extensions of different lengths, wherein only one tappet extension is arranged to act on the lever part.

The lever arm is designed as a spring arm, in particular with respect to an initial obstruction of the engagement teeth from dropping into the tooth valleys, wherein it may only be preferably provided that, with the displacement of the rotation blocking engagement part into the engagement position, a second spring may be tensioned for the return movement into the starting position, and/or that the first spring is stronger than the second spring. In addition, however, the additionally described features may also be additionally implemented, individually or in combination with respect to the solution first described.

Advantageously, both the first spring and the second spring may be substantially detensioned in the starting position of the form-fit locking device, i.e. in the non-engagement position of the rotation blocking engagement part. As a result of this preferred embodiment, at least one of the two springs, in particular the second spring, is initially and only loaded over the course of achieving and holding the engagement position. Regarding the first spring, there may additionally be a substantial detensioning, even in the engagement position.

The first spring may be designed as a torsion spring. In another embodiment, the second spring may also be designed as a torsion spring. Such a torsion spring usually has two spring legs, wherein one spring leg acts on the object to be dampened, the rotation blocking engagement part or the lever part, and the other spring leg rests on a substantially stationary support section.

Thus, according to one preferred embodiment, the second spring may additionally act between the lever part and a mounting part fixed to the fork. The mounting part may be a separate part with respect to the fork and may be fixed to the fork. Additionally, the mounting part may thereby be designed such that this may be used both for a fork for receiving a running wheel with a larger diameter and also for a fork for receiving a running wheel with a comparatively smaller diameter. Correspondingly, the holding part may be a part of the form-fit locking device as a whole, which, as previously described, is designed to be suitable for both running wheel diameters.

Preferably both springs, thus both the first spring and also the second spring, act respectively on one end on the lever part, in particular via a spring leg. In relation to a geometric axis of rotation of the lever part, the spring legs of the two springs may, if applicable, as well as preferably, act on the lever part in opposite directions.

The first, stronger spring may, as is also preferred, act solely between the lever part and the rotation blocking engagement part. An entrainment of this first spring, together with the lever part, preferably also arises during a corresponding rotational/pivoting displacement of the lever part, wherein the resilient lever arm of this first spring acting on the rotation blocking engagement part may be additionally loaded with a corresponding counter load, for example, in the case of a false engagement of the toothing ("tooth-on-tooth position"), while building up a return spring force via the rotation blocking engagement part.

In another embodiment, the second spring may surround a mounting pin of the mounting part, in particular in an area between its spring legs, for example with a coil section. More preferably, this mounting pin centrally accommodates the geometric pivot axis of the mounting part.

According to one possible development, the first spring may be guided in a groove of the lever part, in particular with a spring leg assigned to the lever part. The groove may thereby be designed, with respect to its extension dimension, to be adapted to the diameter of the spring leg transverse to the longitudinal extension of the received spring leg. The spring leg may be inserted substantially loosely in this groove, if applicable, it may also be accommodated in the same in a clamping manner.

The lever part may also have a total of two actuating ends. An actuation end may thereby be, as is also preferred, formed by a rigid stop part for acting on the rotation blocking device in the direction towards the starting position. Additionally, an entrainment section of the rotation blocking engagement part may be substantially captured between this actuating end of the lever part and the resilient lever arm acting in the direction toward the engagement position.

In one preferred embodiment, another actuating end of the lever part, which may be designed substantially opposite to the previously described first actuation end in relation to the geometric axis of rotation of the lever part, interacts directly with the tappet part, the form-fit locking device being actuatable via said tappet part as a whole.

In one preferred embodiment, the mounted tappet part guided on the mounting pin and/or on the fork may be actuated by a switching tappet on the mounting pin side. This switching tappet preferably extends along a pin axis running substantially vertically during normal operation of the caster, and is more preferably linearly displaceable along this pin axis. The switching tappet may thereby be acted on in the usual way via a switching cam accommodated in turn in the mounting pin, in order to switch at least between the starting position and the engagement position of the rotation blocking engagement part, however in addition, if applicable, as is also preferred, to act on a pivot locking device of the fork.

The tappet part may interact with a second return spring. This second return spring loads the tappet part in the direction of an initial position, in which the form-fit locking device, particular the in rotation blocking engagement part, rests in its starting position. The load of the tappet part to act on and displace the rotation blocking engagement part into the engagement position is carried out against the return force of the second return spring. Additionally, the second return spring may thereby experience a support fixed on the fork, if applicable, in the area of the mounting part fixed on the fork. This second return spring may, as is further preferred, be designed as a type of a hairpin spring.

The switching tappet on the mounting pin side has, independently of the tappet part, a separate first return spring, which is preferably arranged in the area of the mounting pin. This may thereby be a conventional cylinder compression spring, which may additionally be arranged, for example, concentrically to the geometric mounting pin axis.

In this context, the design of the caster with only one return spring is also possible. Thus, the (second) return spring, preferably acting directly on the tappet part, may also be used for returning the switching tappet to be entrained via the tappet with part, a corresponding adjustment of the spring force. As another alternative, in the case of a connection of the switching tappet and tappet part, only the (first) return spring assigned to the switching tappet, may be provided.

More preferably, such a second return spring is provided for reducing the switching forces as a whole only in the area of one fork leg or in the area of one tappet extension of the tappet part. Thus, the second return spring may only directly interact with one of the tappet extensions, while the other tappet extension is not directly acted upon by a return spring.

The second return spring may act against the tappet part on the bottom of the end face of the shorter tappet extension in the direction of its initial position. The longer tappet extension may have an access opening for the second return spring, wherein, in a corresponding orientation of the tappet part, the return spring acts against an upper edge of the opening in the usual usage position of the caster.

More preferably, only one of the tappet extensions of the tappet part is acted upon by the second return spring, while the other tappet extension is oriented to potentially act on the lever part of the form-fit locking device.

BRIEF DESCRIPTION OF THE DRAWINGS

The invention is subsequently explained with reference to the accompanying drawing, which, however, merely depicts exemplary embodiments. A part, which is only explained in relation to one of the exemplary embodiments and is not replaced by another part in another exemplary embodiment due to the special feature identified there, is thus also described as an at least possibly present part for this further exemplary embodiment. As shown in:

FIG. 4 a rotation blocking engagement part of the form-fit locking device in an individual perspective depiction;

FIG. 5 the view of the rotation blocking engagement part according to arrow V in FIG. 4;

FIG. 6 the view of the rotation blocking engagement part according to arrow VI in FIG. 4;

FIG. 7 the view of the rotation blocking engagement part according to arrow VII in FIG. 6;

FIG. 13 a mounting part of the form-fit locking device in an individual perspective depiction;

FIG. 14 the view of the mounting part according to arrow XIV in FIG. 13;

FIG. 15 the view of the mounting part according to arrow XV in FIG. 13;

FIG. 16 the form-fit locking device in a perspective depiction;

FIG. 17 the form-fit locking device in a view according to arrow XVII in FIG. 16;

FIG. 18 the form-fit locking device in another perspective depiction;

FIG. 19 the sectional view according to line XIX-XIX in FIG. 17;

FIG. 20 the sectional view according to line XX-XX in FIG. 17;

FIG. 21 a tappet part of the form-fit locking device in an individual perspective depiction;

FIG. 22 the sectional view according to sectional plane XXII in FIG. 21;

FIG. 31 a sectional depiction through the caster according to FIG. 24, but relating to a second embodiment of a tappet part of the form-fit locking device;

FIG. 32 the tappet part of the embodiment according to FIG. 31 in an individual perspective depiction;

FIG. 33 the sectional view according to sectional plane XXXIII in FIG. 32;

DESCRIPTION OF THE EMBODIMENTS

Figure 1:
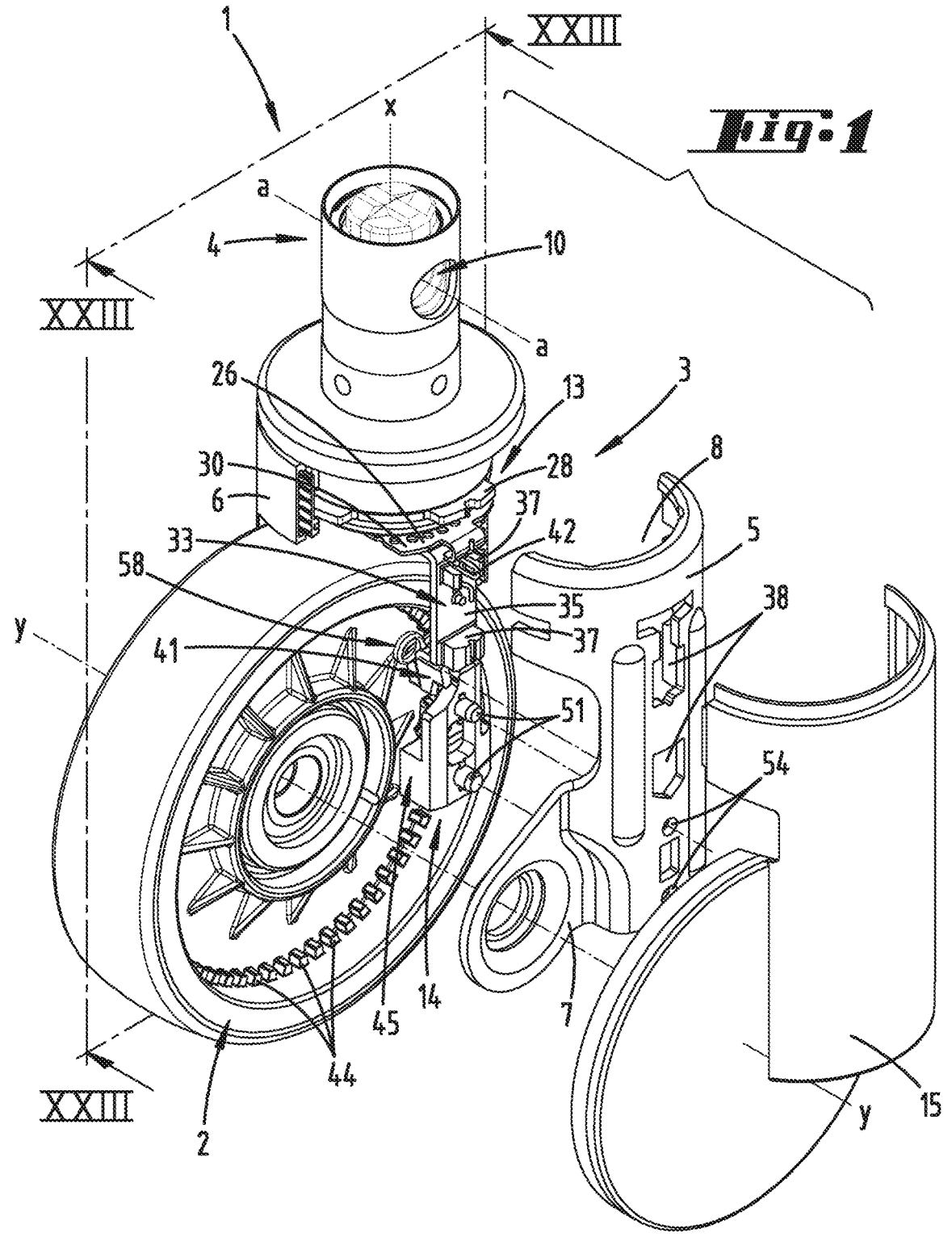
FIG. 1 a caster with a form-fit locking device in an exploded perspective depiction.

A caster 1, which designed in the depicted is embodiments as a type of swivel caster, is initially depicted and described with reference to FIGS. 1 and 2.

Caster 1 essentially has a running wheel 2 and a fork 3 from which a cylindrical mounting pin 4 extends. Mounting pin 4 surrounds a geometric pivot axis x, which projects vertically upwards in relation to running wheel 2 when caster 1 is in the normal operating state.

Fork 3 may be, as also depicted, essentially formed from two fork shell parts 5, 6, wherein each fork shell part 5, 6 supports a fork leg 7.

Fork shell parts 5, 6 of fork 3 grasp running wheel 2, mounted in fork cavity 8 preferably intended therefor, with their fork legs 7, which are preferably substantially congruent in the direction of an axis of rotation y. According to the depicted exemplary embodiment, a hollow axle 9, which centrally traverses running wheel 2 and is preferably supported at each respective end on fork legs 7, may function to mount running wheel 2. The resulting geometric axis of rotation y of running wheel 2 extends preferably and substantially transverse to pivot axis x, and thus substantially in a horizontal plane in the normal operational use of caster 1.

Depicted caster 1 may be positioned, for example, on a hospital bed or the like. The fixing may be carried out in the usual way by using mounting pin 4.

A switching cam 10 arranged to be pivotable about an actuating axis a may additionally be provided in mounting pin 4 in the area of an upward facing free end. Actuation axis a may thereby extend substantially perpendicular to pivot axis x of caster 1. Switching cam 10 may have, for the entrainment of cam 10, a centrally arranged, non-circular, coupling opening 11, if applicable, hexagonal according to the exemplary embodiment depicted, which may be traversed by a shift lever shaft (not depicted) for actuation.

Figure 23:
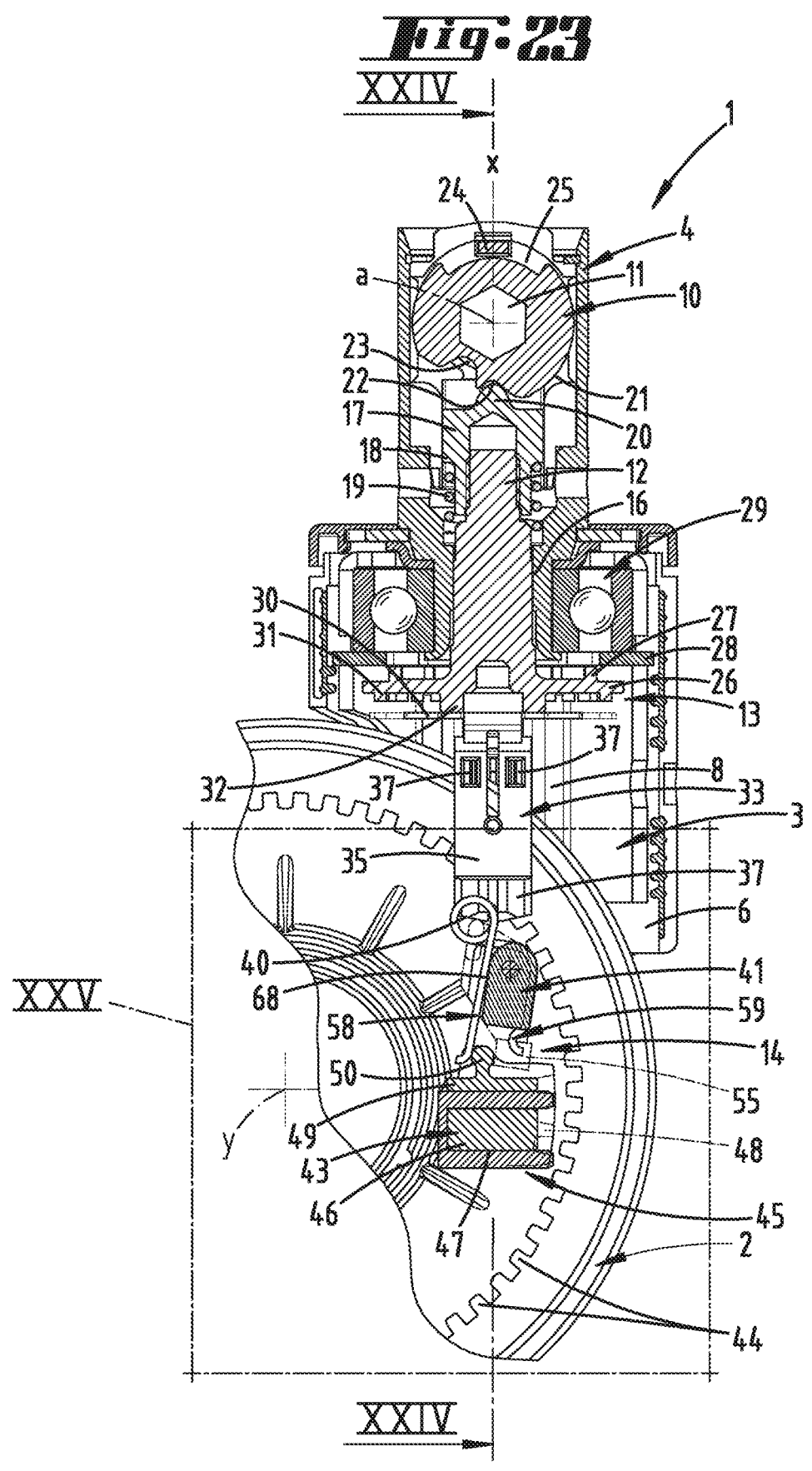
FIG. 23 the sectional view through the caster according to sectional plane XXIII in FIG. 1 relating to a starting position of the form-fit locking device.

With reference to the depiction in FIG. 23, for example, a switching tappet 12, via which a pivot locking device 13 and/or a form-fit locking device 14 may be actuated or released, is provided underneath switching cam 10.

Figure 2:
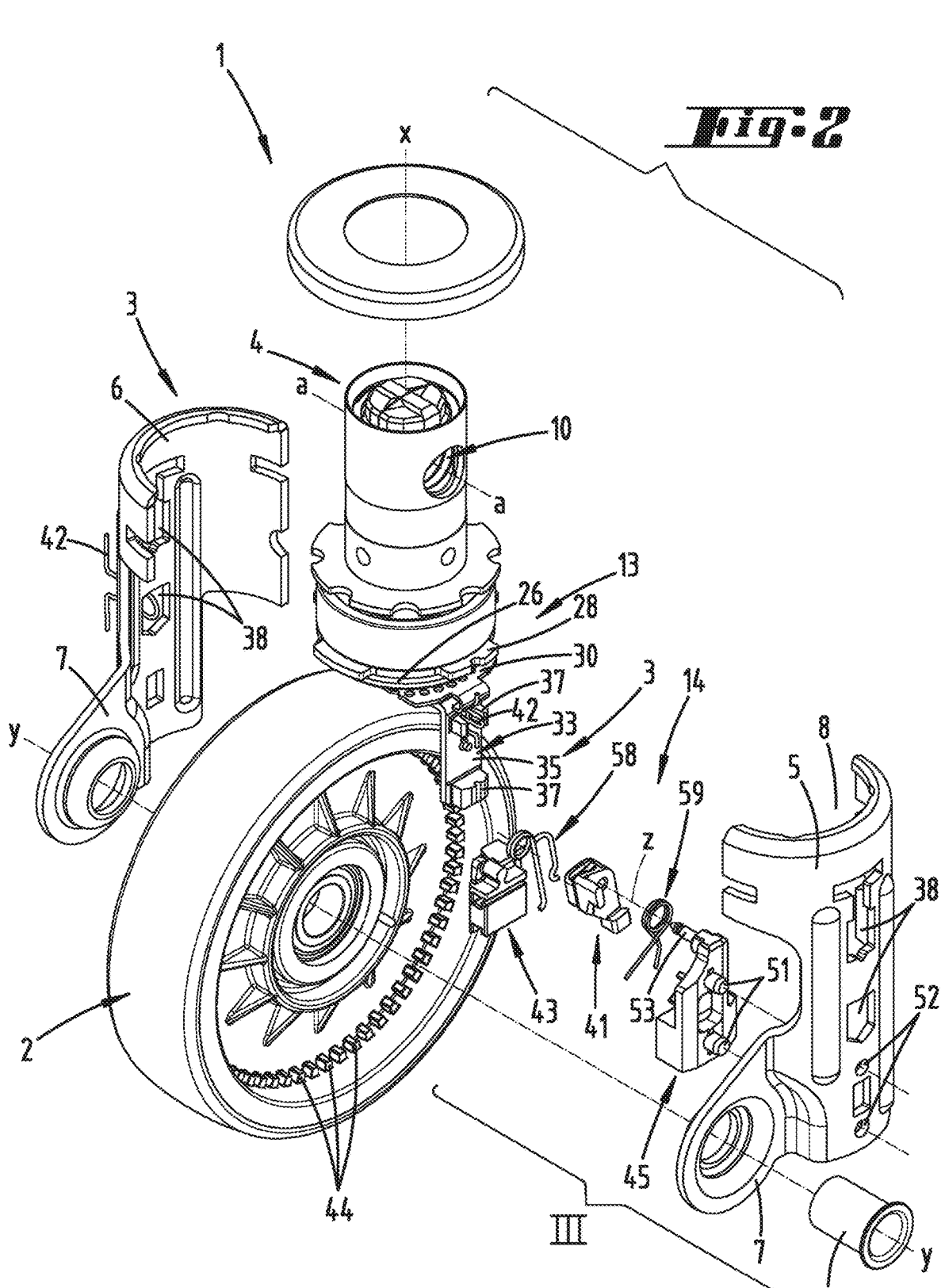
FIG. 2 the caster in another exploded perspective depiction.
Figure 3:
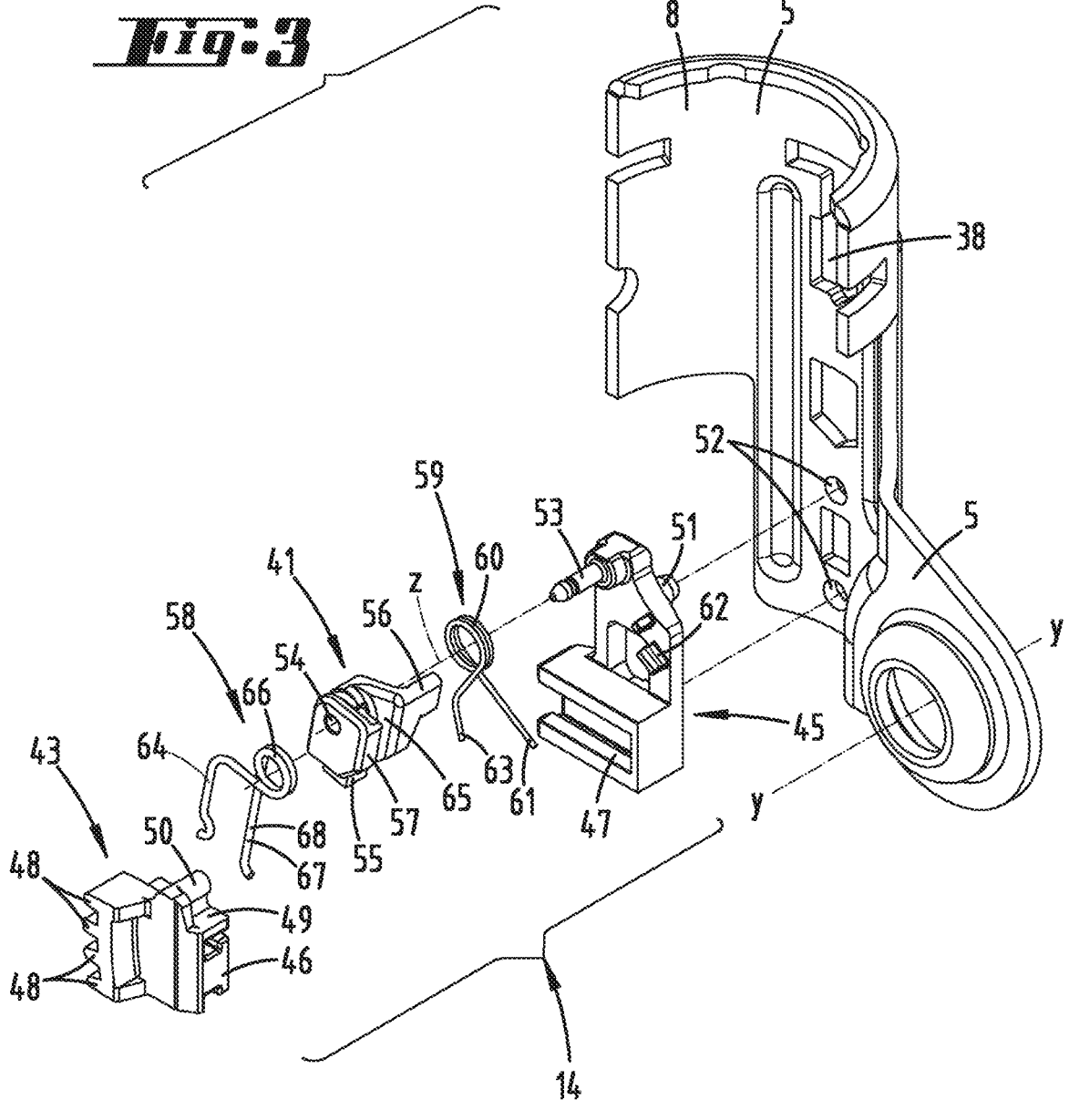
FIG. 3 area III in FIG. 2 in another exploded perspective depiction.
Figure 8:
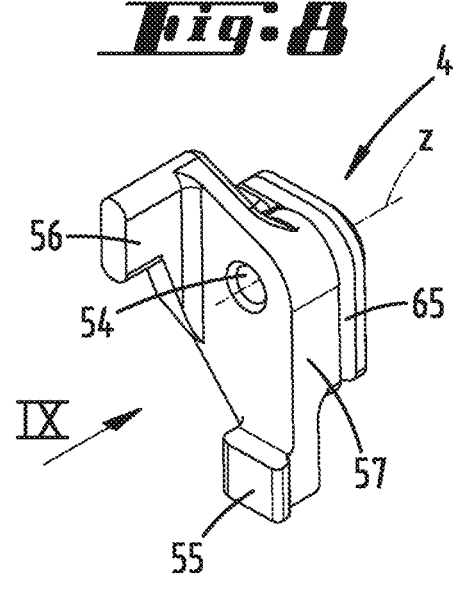
FIG. 8 a lever part of the form-fit locking device in an individual perspective depiction.
Figure 9:
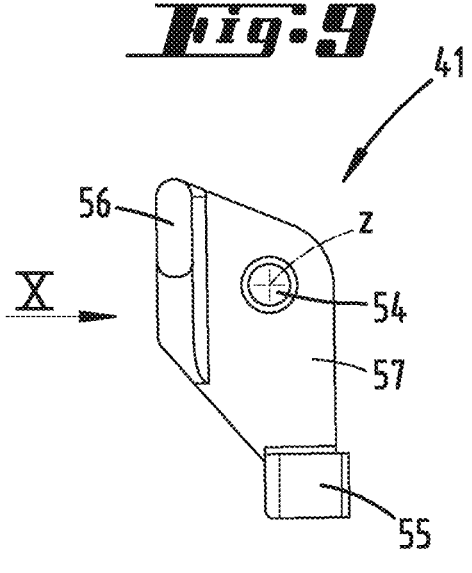
FIG. 9 the view of the lever part according to arrow IX in FIG. 8.
Figure 10:
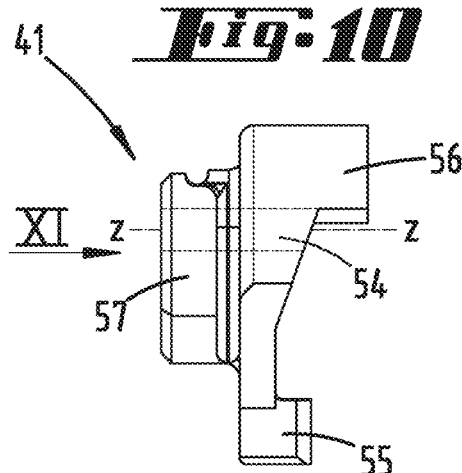
FIG. 10 the view of the lever part according to arrow X in FIG. 9.
Figure 11:
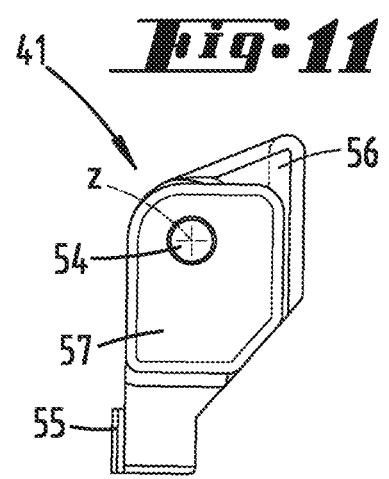
FIG. 11 another view of the lever part according to arrow XI in FIG. 10.
Figure 12:
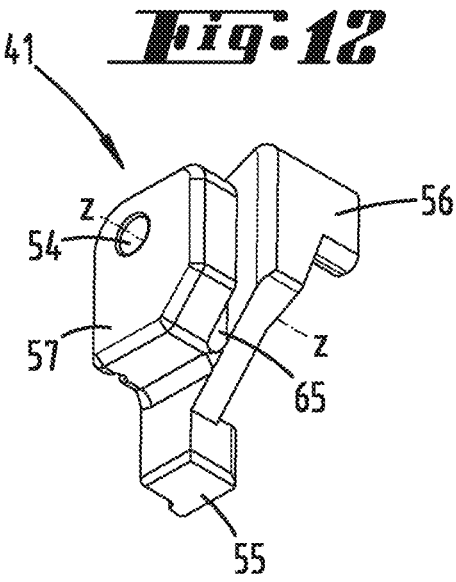
FIG. 12 the lever part in another perspective depiction.

In particular, the configuration of pivot locking device 13 and form-fit locking device 14, additionally also fork shell parts 5 and 6, may be covered by housing shells 15, which additionally also cover the hub area of running wheel 2 according to the depiction in FIG. 1.

Switching tappet 12 is oriented in mounting pin 4 preferably about pivot axis x and is thereby preferably vertically displaceable and secured against rotation. For this purpose, mounting pin 4 may have a passage 16 with a reduced diameter, which is likewise preferably oriented about pivot axis x, which may, if applicable, be adapted in cross section to switching tappet 12 for guiding.

As FIG. 23 shows, for example, the free end of switching tappet 12, formed between the opening of passage 16 and switching cam 10, may be screw-connected, for example, to a cam part 17. Cam part 17 may hereby preferably have a pot-like shape with a more preferably circular cross-section, wherein an area with an increased diameter may be formed on the end facing away from switching tappet 12 as an annular collar 18. In addition, cam part 17 of switching tappet 12 is preferably guided vertically along pivot axis x within mounting pin 4 in relation to the depictions.

In addition, the section of cam part 17 with a reduced diameter, in comparison to annular collar 18, may be surrounded by a first return spring 19, wherein one end of first return spring 19 may be supported on the underside of annular collar 18. The other opposite spring end may be supported on an edge of passage 16. It may thus be provided that switching tappet 12 is spring-loaded in the direction of switching cam 10 by means of first return spring 19. In addition, as is also preferred, the end face of optionally provided annular collar 18, which faces switching cam 10, may have a central shape in the form of a counter-cam 20.

Switching tappet 12 with preferably provided counter-cam 20 interacts with facing control surface 21 of switching cam 10, which control surface 21 may additionally have two control recesses 22 and 23, of different depths with respect to the radial distance from actuating axis a and arranged one behind the other in the circumferential direction of switching cam 10.

Switching cam 10 is stop-limited in its pivoting movement when viewed in the circumferential direction of control surface 21. For this purpose, a stop projection 24 on the mounting pin side may engage, as depicted, in a correspondingly provided circumferential groove 25 of switching cam 10. As is example, clear, for from the depiction in FIG. 23, circumferential groove 25 is provided substantially opposite control recesses 22 and 23 in relation to actuation axis a, wherein circumferential groove 25, extending in the circumferential direction, additionally extends across an angular range of approximately 90 degrees.

Switching tappet 12, when viewed in the direction of running wheel 2, preferably extends in the direction of fork cavity 8 or up into the same. Fork cavity 8 preferably surrounds a shape of switching tappet 12 that is circular in cross-section, which shape may be larger in diameter than an upper area of switching tappet 12. The shape may assume the function of a locking plate 26, which may be formed on switching tappet 12 surrounding pivot axis x transversely to the same.

Locking plate 26 may have locking formations 27 on its plate surface facing switching cam 10. In a so-called fixed caster position, in which fork 3 with running wheel 2 may preferably only assume two positions relative to mounting pin 4 which are offset by 180 degrees from one another, these locking formations 27 may be pressed evenly against the underside of a directional locking part 28 by the spring force of first return spring 19. Directional locking part 28 may thereby be fixed, in particular, on fork 3, additionally, for example, in an area in which fork 3 is held as a whole on mounting pin 4 via a bearing 29 and is pivotable about pivot axis x relative to said mounting pin.

Locking plate 26 with its locking formations 27, direction locking part 28, and a rotation blocking part 30, subsequently described in more detail, are essentially part of pivot locking device 13.

The fixed caster position may be adopted by rotating switching cam 10 into an interacting position of counter-cam 20 with control recess 23, or another equivalent shape. In comparison with the neutral position shown in FIG. 23, in which counter-cam 20 engages in additional control recess 22, the fixed caster position, with reference to the figures, may thereby cause a lifting of cam part 17 and of switching tappet 12, and thus also of locking plate 26, into the interacting position with directional locking part 28, as a result of the spring force applied via first return spring 19.

Switching tappet 12 may additionally have rotation blocking projections 31 on the underside of locking plate 26 facing away from locking formations 27. These rotation blocking projections may extend, for example, coaxially to pivot axis x and respectively in the circumferential direction of locking plate 26.

Starting from locking plate 26, when viewed in the direction of running wheel 2, a preferably circular, cylindrical extension 32 with a reduced diameter compared to locking plate 26 may arise from switching tappet 12 and may, in turn, be inserted for technical guiding in a centrally arranged through opening of rotation blocking part 30 arranged about pivot axis x. Rotation blocking part 30, inserted in fork cavity 8 between running wheel 2 and locking plate 26, may, like directional locking part 28, likewise be non-rotatably mounted using fork 3 and may be formed, for example, as a stamped and bent part.

Rotation blocking part 30 may have blocking receptacles adapted to the geometry of rotation blocking projections 31. Rotation blocking part 30 is preferably supported on the fork side via spring elements 70 acting substantially in the direction of pivot axis x.

Figures 26, 27:
FIG. 26 a sectional depiction according to FIG. 23 relating to an engagement position of the form-fit locking device.
FIG. 27 the enlarged area XXVII in FIG. 26 in a depiction offset in a plane along the axis of rotation.
Figure 28:
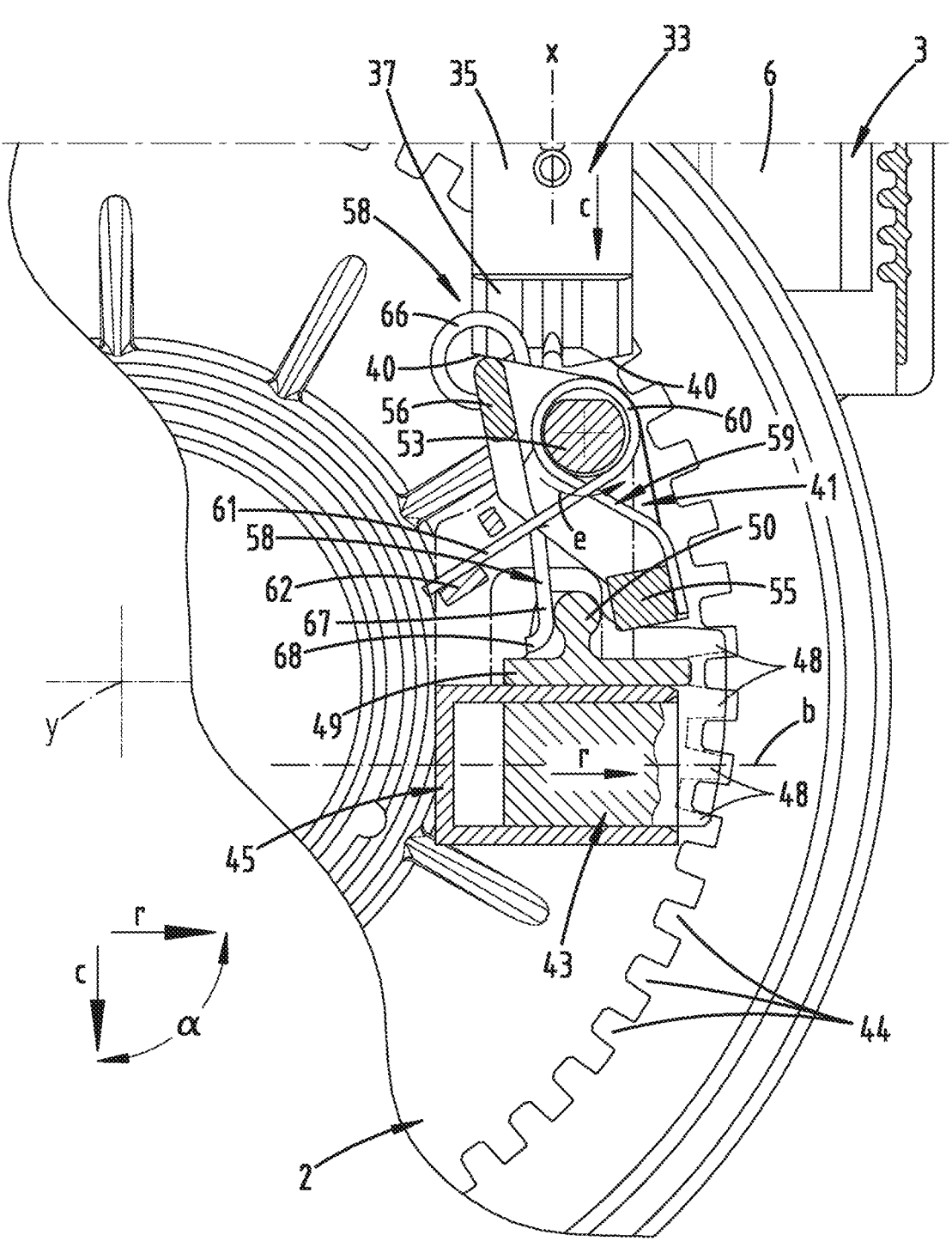
FIG. 28 a depiction corresponding to FIG. 25, but relating to the engagement position according to FIG. 26.

As a result of the interaction of rotation blocking projections 31 of locking plate 26 and the blocking receptacles in rotation blocking part 30, caster 1 may be fixed in different pivot positions about pivot axis x. For this purpose, switching cam 10 may be pivoted about its actuating axis a into a position in which counter-cam 20 contacts control surface 21 of switching cam 10 extending radially outward in the circumferential direction, according to the depiction in FIG. 26. Counter-cam 20 may be moved, together with switching tappet 12, against the force of first return spring 19, downward with respect to the depictions. Rotation blocking projections 31 may engage into the associated blocking receptacles to prevent pivoting.

At the same time, as is also preferred, a rotational locking of running wheel 2 may also be achieved in this position. Form-fit locking device 14 functions for this purpose.

Part of form-fit locking device 14 is a fork-shaped tappet part 33, which is shown in a first embodiment in FIGS. 21 and 22 in individual depictions and is used in a caster 1 according to the depictions in FIGS. 1 to 30

Tappet part 33 has a crossbar-like section of the U bridge section 34, which, in the usual arrangement position in the area of fork cavity 8 on the underside of extension 32 of switching tappet 12, extends in a direction transverse to pivot axis x. Said bridge section 34 is substantially traversed centrally by pivot axis x, and, facing away from switching tappet 12, supports at each end tappet extensions 35 and 36 each extending downward, substantially in orientation with pivot axis x. There results from tappet extensions 35, 36 and bridge section 34 an overall substantially U-shape of tappet part 33, wherein the U-opening is traversed by the running surface of running wheel 2, so that tappet extensions 35 and 36 extend on both sides of running wheel 2.

In another embodiment, tappet part 33 is linearly guided in orientation with pivot axis x via tappet extensions 35 and 36. For this purpose, tappet extensions 35 and 36 have outwardly directed guide projections 37 which engage in correspondingly positioned guide openings 38 in the area of fork shell parts 5, 6. Guide openings 38 are thereby additionally designed in such a way that they allow a limited displacement of tappet part 33 as a whole along pivot axis x at a corresponding engagement of guide projections 37.

Tappet part 33 may support pins 39 on the upper side of bridge section 34, pins which may engage in correspondingly positioned and adapted openings designed in rotation blocking part 30, by means of which rotation blocking part 30 is non-rotatably connected to fork 3 via tappet part 33.

With reference to a side view of tappet part 33, in particular of a tappet extension 35, 36, in which side view axis of rotation y of running wheel 2 is depicted as a point and pivot axis x as a line, obliquely extending control surfaces 40 for acting on a lever part 41 of form-fit locking device 14 arise on the underside of the respective free end of a tappet extension 35, 36.

In one preferred embodiment, a movement of tappet part 33, directed downwards with reference to the depictions, for example in FIG. 23, is carried out via the applied entrainment via switching tappet 12. However, there is preferably no form-fit that would allow tappet part 33 and switching tappet 12 to be dragged, correspondingly upward with reference to FIG. 23, back into the neutral position as a result of the spring tensioning via first return spring 19. Instead, a separate second return spring 42, for example as a type of hairpin spring, is provided for this purpose, which is held in a fork-shell part 5, 6 and acts with its spring arm against one of tappet extensions 35, 36. Second return spring 42 preferably interacts with the tappet extension, which, as a result of the arrangement of tappet part 33, is not designed for direct interaction with lever part 41.

In the first embodiment depicted in FIGS. 1 to 30, in which tappet sections 35 and 36 are designed to be the same length, second return spring 42 acts on the underside of tappet extension 36, which is not positioned to act on lever part 41 of form-fit locking device 14.

Both return springs 19 and 42 act substantially in the same direction, namely, with reference to the depictions, for example FIG. 23, in the orientation of pivot axis x upwards in the direction towards switching cam 10. There arises a preferably spring independent tensioning of switching tappet 12 and tappet part 33.

In addition to lever part 41, another essential component of form-fit locking device 14 is a rotation blocking engagement part 43, which is preferably designed to interact with a circumferential toothing 44 provided on the inside of the running wheel.

Rotation blocking engagement part 43 may be mounted to be slidable on a mounting part 45 that is fixed on a side of a fork leg. The sliding mobility is provided in particular by a sliding extension 46, which is configured to be T-shaped in a cross section transverse to a displacement direction r of rotation blocking engagement part 43 and is guided in a sliding receptacle 47 of mounting part 45 adapted to the cross section (compare, for example, FIGS. 4, 13, and 16).

Figure 25:
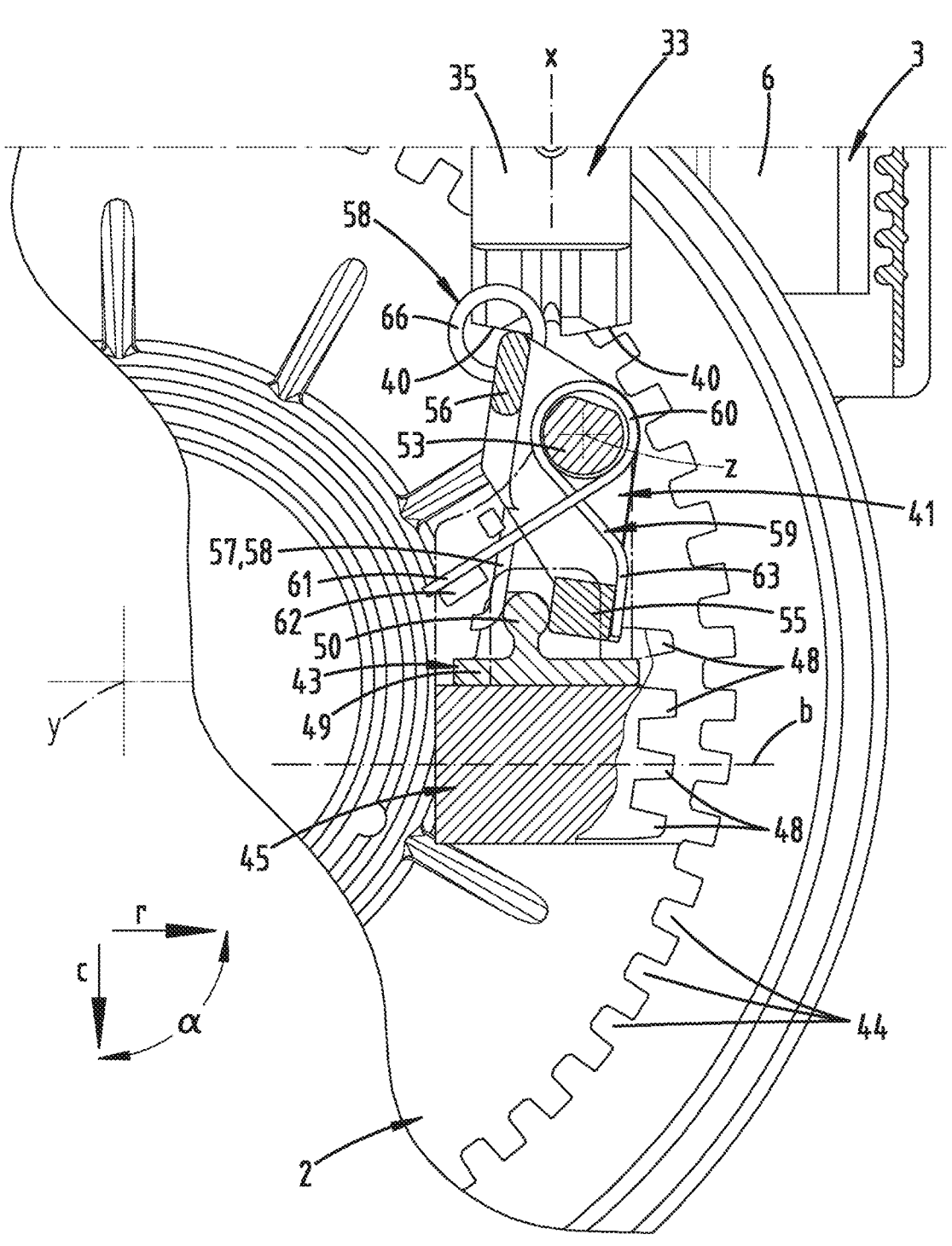
FIG. 25 an enlarged depiction of area XXV in FIG. 23 offset in a plane along an axis of rotation of a running wheel of the caster.

The arrangement and orientation of rotation blocking engagement part 43 may additionally be selected such that rotation blocking engagement part 43 may be movable along a line b, oriented perpendicularly to pivot axis x in a side view, for example, according to FIG. 25. Line b is thereby preferably substantially horizontal in the usual orientation of caster 1, so that, in relation to a projection in a plane in which axis of rotation y is depicted as a point, corresponding for example to FIG. 25, direction of displacement r of rotation blocking engagement part 43 substantially defines a right angle α to direction of movement c of switching tappet 12 and of tappet part 33.

Rotation blocking engagement part 43 has two or more, four in the depicted embodiment, locking teeth 48 facing toothing 44 of running wheel 2, adapted in their spacing and configuration to toothing 44, spaced apart from one another in the circumferential direction of running wheel 2, and offset to the plane of sliding extension 46 in the orientation of axis of rotation y.

Rotation blocking engagement part 43 additionally supports a plate-like support section 49 above sliding extension 46 and spaced vertically apart from the same in the installed and use state, if applicable, lying on sliding receptacle 47 of mounting part 45 in the use state and sliding across said sliding receptacle 47, on which support section 49 a cam-like entrainment projection 50 is formed in turn. Entrainment projection 50 functions to interact with lever part 41.

Mounting part 45 is arranged and held on the inner side of one of fork shell parts 5, 6, for which purpose mounting part 45 may have outwardly facing fastening pins 51 which engage in a holding manner in correspondingly positioned receiving openings 52 of fork shell part 5.

Mounting part 45 supports a mounting pin 53 opposite to fastening pin 51 and facing correspondingly inwards. Lever part 41 is mounted on said mounting pin by its passing through a correspondingly positioned pin receptacle 54, in order to be pivotable about a pivot axis z oriented parallel to axis of rotation y and perpendicular to direction of displacement r of rotation blocking engagement part 43.

Lever part 41 has a first actuating end 55 for interaction with entrainment projection 50 of rotation blocking engagement part 43. In addition, starting from this first actuating end 55, another, second actuating end 56 is formed on the other side of pin receptacle 54 in the shape of a shoulder extending approximately in the orientation of pivot axis z. This second actuating end 56 functions to interact with tappet part 33, in particular with control surface 40 of the assigned tappet extension.

Lever part 41 and rotation blocking engagement portion 43 are preferably slidably or rotatably supported together on support portion 45, as is also depicted and described. It is thereby additionally preferably provided that form-fit locking device 14, configured in this way, is solely provided on one side, assigned only to one fork leg 7, more particularly only to one fork shell part 5.

A stop block 57 is additionally formed as one piece with and preferably from the same material as actuating ends 55 and 56 and in the shape of a thickening of lever part 41 in the extension direction of pivot axis z and connecting to the area having actuating ends 55 and 56.

Additionally, two springs are preferably components of form-fit locking device 14, both of which are preferably designed as a type of torsion springs. A first spring 58 is thus initially provided which acts between lever part 41 and rotation blocking engagement part 43, and a second spring 59 is provided which acts between lever part 41 and mounting part 45 fixed to the fork.

Starting from a central winding section 60 accommodated by mounting pin 53, one spring leg 61 extends toward second spring 59 while laying against a support bracket 62 of mounting part 45 fixed to the fork, while other spring leg 63 is supported in the area of first actuating end 55 of lever part 41, so that by this means a corresponding spring loading of lever part 41 arises in the direction of a starting position or initial position which allows free running of running wheel 2.

One spring leg 64 of first spring 58 is guided in a groove 65 in the area of stop block 57 of lever part 41, and is additionally also held clamped therein, if applicable. This spring leg 64 thereby acts on an area of stop block 57 which faces away from second actuating end 55 of lever part 41, whereas, in this context, winding section 66 is substantially assigned to second actuating end 56, from which winding section other spring leg 67 originates, forming a lever arm 68 of lever part 41, and is designed for acting on entrainment projection 50 of rotation blocking engagement part 43. Resilient lever arm 68 configured in this way acts on the side of entrainment projection 50 facing away from first actuating end 55 of lever part 41.

Figure 24:
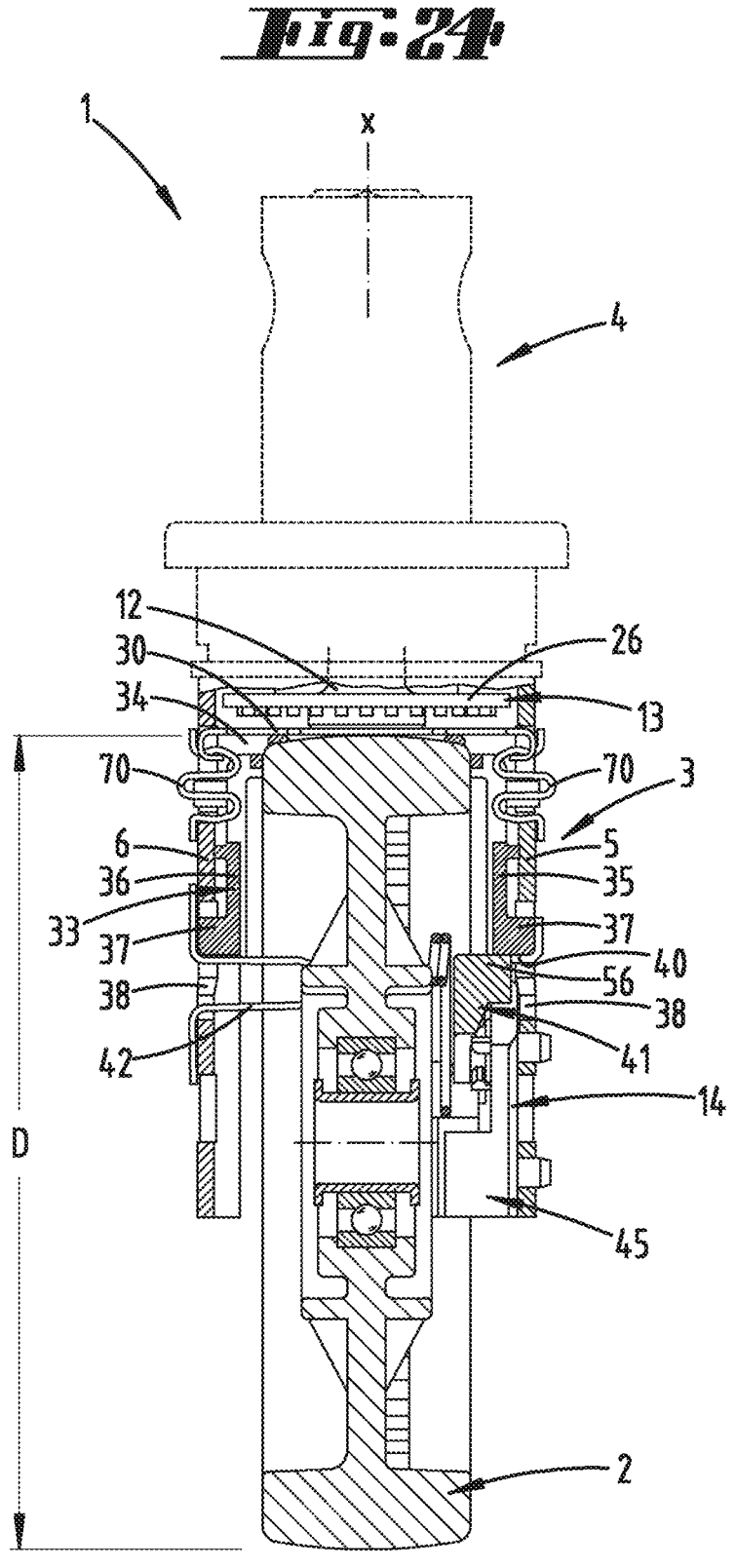
FIG. 24 the sectional view through the caster according to line XXIV-XXIV in FIG. 23.

Both springs 58 and 59 thus respectively act with one spring leg 63, 64 on lever part 41, wherein additionally both springs 58 and 59 are preferably and substantially detensioned in the neutral or starting position, depicted in particular in FIGS. 23 to 25, correspondingly not acting or not substantially acting with a spring force on lever part 41 and/or rotation blocking engagement part 43.

During a rotary displacement of switching cam 10, stop limited if applicable, in direction d (compare FIG. 26), a switching position is reached in which, as a result of the lowering of switching tappet 12 in direction of movement c, counter-cam 20 comes into contact on control surface 21. In addition to the previously described potential pivot blocking of fork 3 relative to mounting pin 4 as a result of the positive locking engagement between rotation blocking part 30 and rotation blocking projections 31 of locking plate 26, an actuation of second actuating end 56 of lever part 41 additionally arises via entrained tappet part 33 and the tappet extension 35 and also via control surface 40.

In the course of this lowering movement, lever part 41 is pivotably displaced about its pivot axis z in the direction of arrow e (compare FIG. 28), wherein rotation blocking engagement part 43 is moved linearly in displacement direction r via lever arm 68 of the first spring formed by the spring leg 67 lying on entrainment projection 50. Preferably no or no significant change in angle between spring legs 67 and 64 of first spring 58 arises over the course of the entrainment of rotation blocking engagement part 43—at least up to a potential blocking position of rotation blocking engagement part 43. Instead, first spring 58 preferably remains substantially detensioned up to a blocking position.

Rotation blocking engagement part 43 is moved via first spring 58, in particular via resiliently-designed lever arm 68, in the direction toward a positive locking position with toothing 44 of running wheel 2. In this type of positive locking position, locking teeth 48 of rotation blocking engagement part 43 engage in toothing 44 of running wheel 2, so that the latter is rotationally blocked (see also FIG. 27).

In the course of the pivotal displacement of lever part 41, induced in the direction toward the locking position, a tensioning of second spring 59 results, which additionally acts as a type of return spring for lever part 41. During an adoption of the positive locking position with virtually no resistance, as previously described, only the force of second spring 59 has to be overcome regarding form-fit locking device 14.

Figure 29:
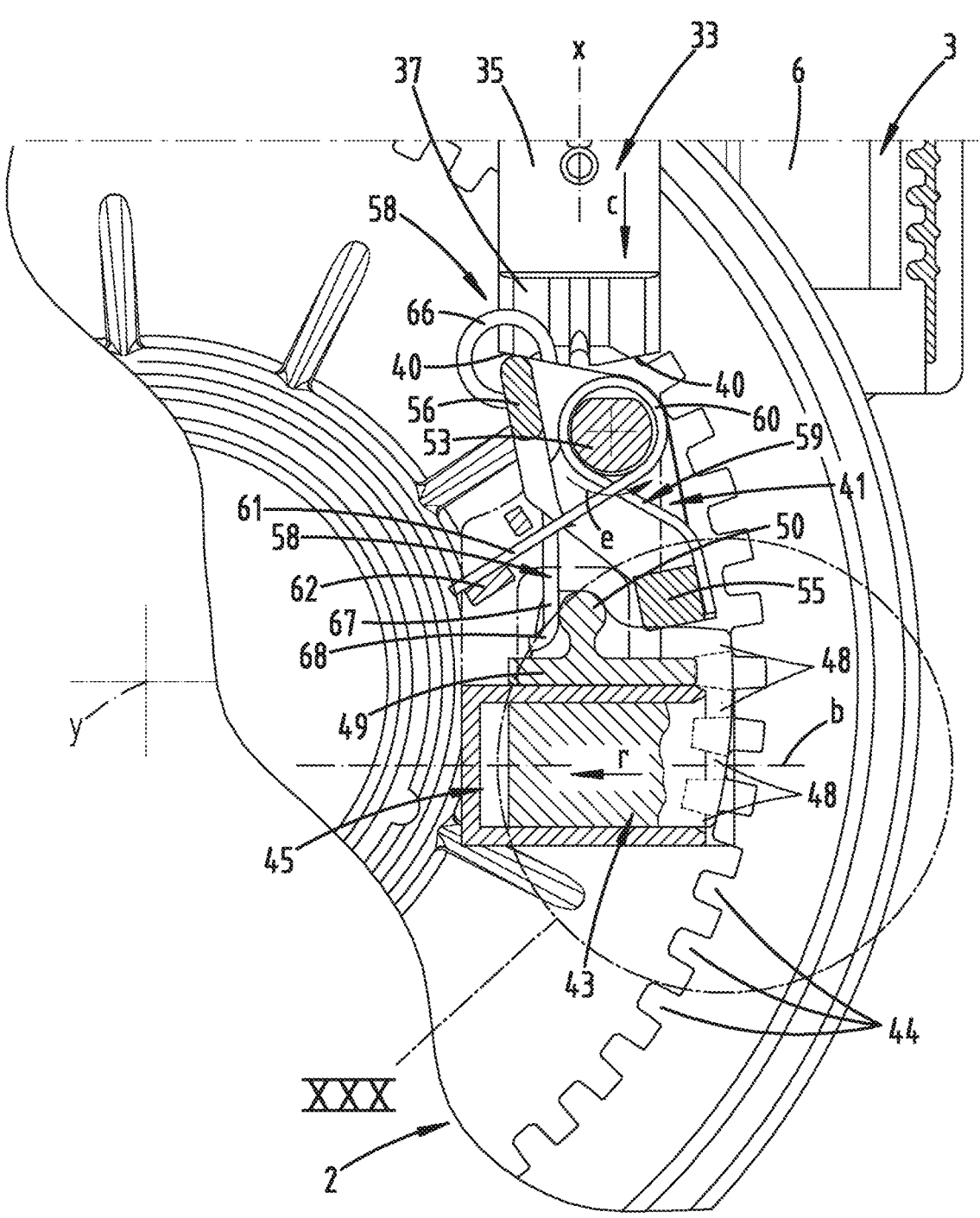
FIG. 29 a depiction corresponding to FIG. 28, but relating to a prepared engagement position.
Figure 30:
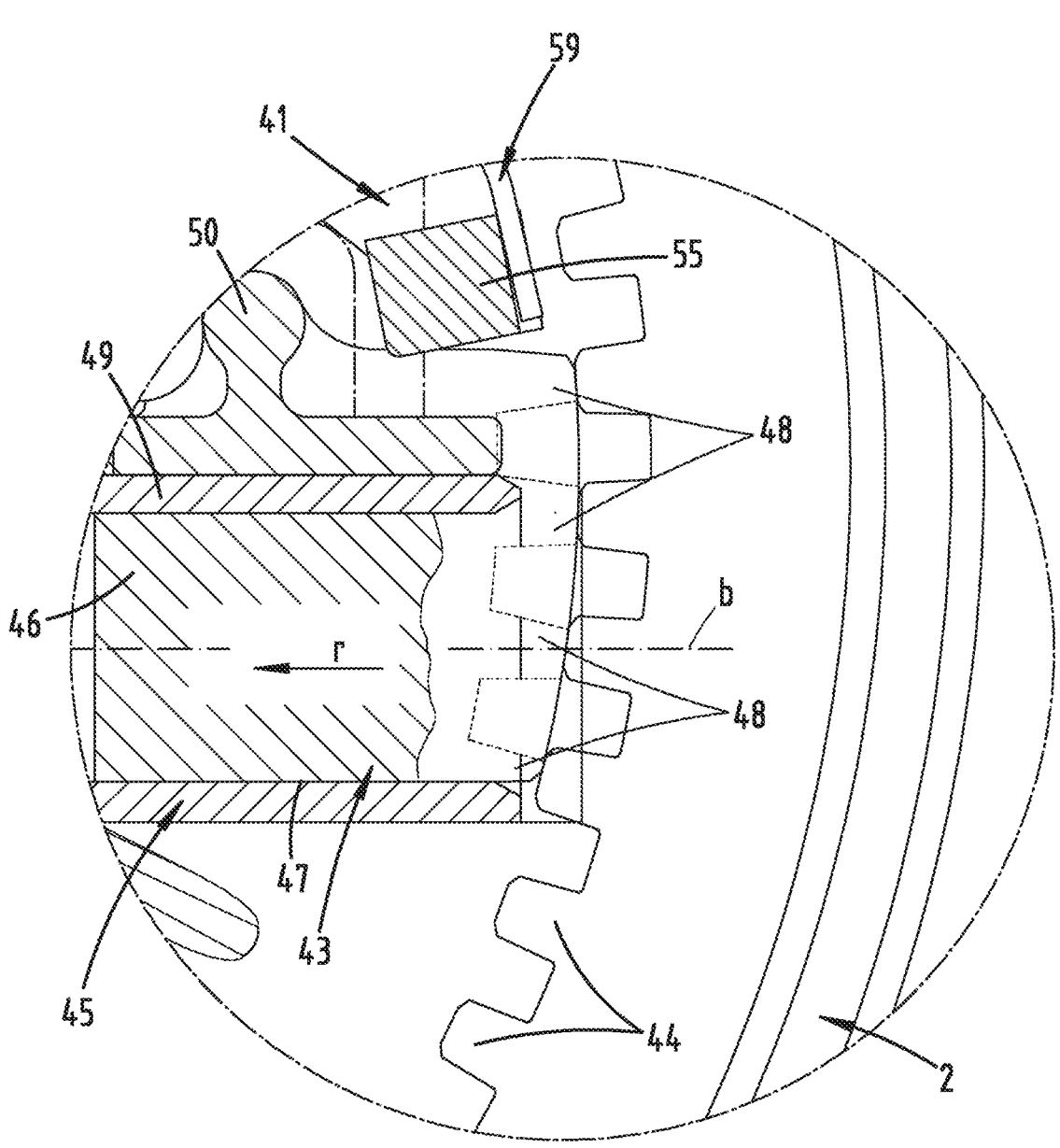
FIG. 30 an enlarged detail view according to FIG. 27, but relating to the prepared engagement position according to FIG. 29.

During normal use of caster 1, however, the state repeatedly arises that, in the course of the attempt to assume the locking position, locking teeth 48 of rotation blocking engagement part 43 contact against the teeth of toothing 44 on running wheel 2 in an obstructive way (compare the depiction in FIGS. 29 and 30). However, the proposed solution also allows for a complete displacement of switching tappet 12 and tappet part 33 as well as a complete rotational displacement of lever part 41, despite the prevention of the complete displacement of rotation blocking engagement part 43. Only spring leg 67, acting on entrainment projection 50 of rotation blocking engagement part 43 and forming lever arm 68, deflects as a result of the blockage, whereby a spring force is built up in first spring 58, which is designed to be fundamentally stronger than second spring 59. This spring force, which forms a force reserve, is preferably built up only in this type of a blocked position ("tooth-to-tooth"). A subsequent rotational displacement of running wheel 2 by one or two angular degrees leads to an automatic adoption of the locking position while releasing the spring tension of first spring 58.

To release this locking position (and, if applicable, the pivot locking), switching cam 10 is displaced back counter to direction of rotation d, while retracting counter-cam 20 into one of control recesses 22 or 23, wherein the correspondingly resulting action shifts switching tappet 12 back upward via first return spring 19 and displaces tappet part 33 back upward via second return spring 42, with reference to the depictions. Lever part 41 may, as a result of a lack of support by second actuation end 56 on assigned tappet extension 35, pivot back against direction of rotation e, while releasing the spring force of second spring 59, wherein rotation blocking engagement part 43 is pushed back linearly in the direction of displacement r via first actuating end 55, which is supported on entrainment projection 50. Locking teeth 48 leave the area of toothing 44, after which running wheel 2 is again freely rotatable about its axis of rotation y. Due to the preferably detensioned arrangement of first spring 58, no or no significant effort to overcome a setting force in first spring 58 and a force opposing the displacement backwards arises in the course of this controlled rearward displacement of rotation blocking engagement part 43 via lever part 41.

The starting position, in particular of the rotation blocking engagement part, is preferably stop limited.

As may be seen from the sectional depiction in FIG. 24, second return spring 42 is arranged opposite form-fit locking device 14 in relation to a center plane of the running wheel viewed perpendicular to axis of rotation y, so that this second return spring 42, preferably designed as a hairpin spring, acts with a spring leg against exposed tappet extension 36 from the underside.

Additionally, tappet extensions 35 and 36 of the first embodiment depicted in FIGS. 1 to 30 are designed with substantially the same length l starting from bridge section 34 (compare FIG. 22).

FIGS. 31 to 34 show another embodiment with respect to the tappet part 33, in which a tappet extension 36 is provided with a length l', which is selected to be greater than length l of other tappet extension 35. For example, tappet extension 36 may thus have a length l', which may correspond to approximately 1.2 to approximately 1.6 times, for example, more approximately to 1.4 times length l of shorter tappet extension 35.

Both tappet extensions 35 and 36 are preferably designed with previously described control surfaces 40 on the underside.

FIG. 31 shows an arrangement of a tappet part 33 configured in this way, in which tappet part 33 is oriented such that-according to the previously described first embodiment-shorter tappet extension 35 provided with length 1 is arranged for acting on lever part 41, while the longer tappet extension 36 with length l' is arranged assigned to second return spring 42. An access opening 69 for interacting with second return spring 42 is provided in longer tappet extension 36 for the same positioning of second return spring 42 inside of assigned fork shell part 6.

This previously described arrangement is selected for a caster 1 with a running wheel 2 having a diameter dimension D.

Figure 34:
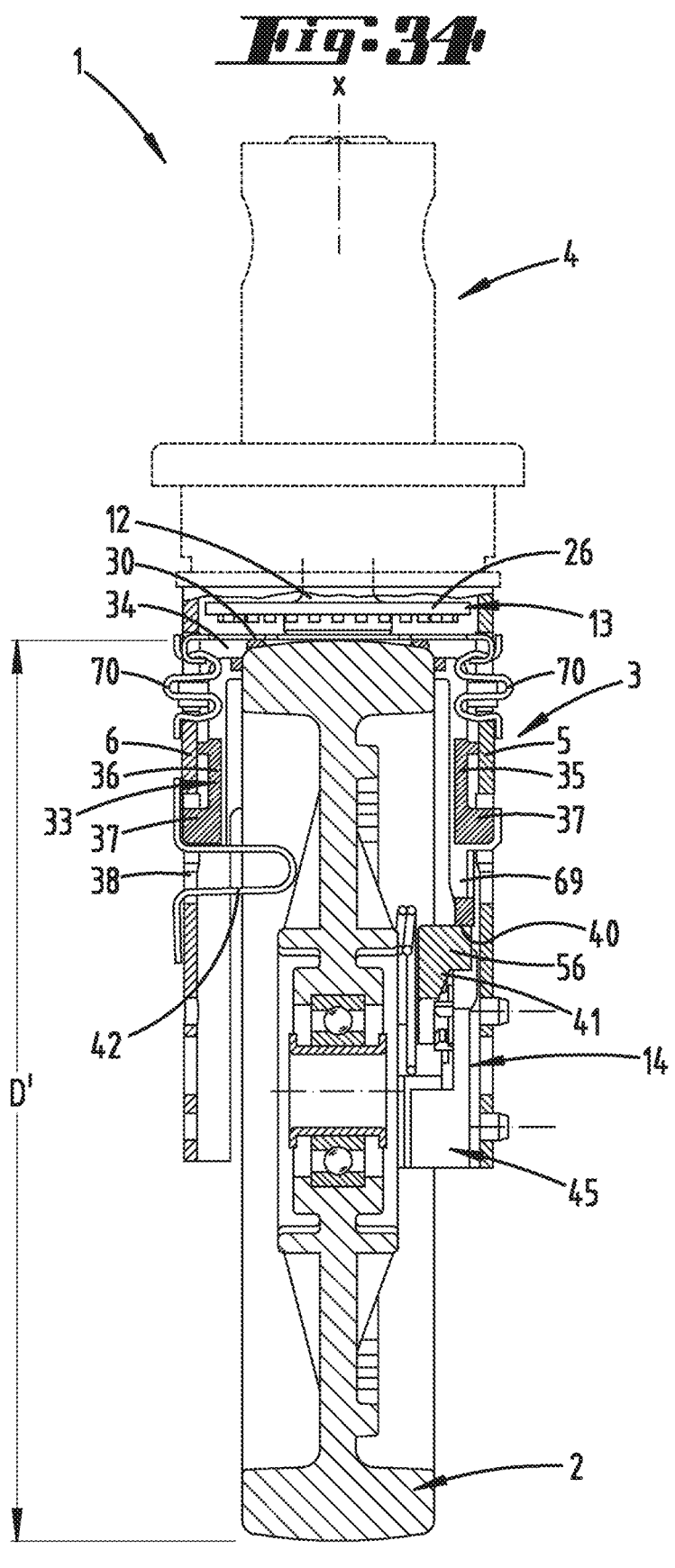
FIG. 34 a sectional depiction according to FIG. 31, but relating to a modified arrangement of the tappet part of the second embodiment.

Due to an arrangement of tappet part 33 rotated by 180 degrees—in relation to pivot axis x—relative to the other components of form-fit locking device 14, using substantially the same components (with the exception, in particular, of fork 3 and running wheel 2), a caster 1 may also be equipped with a running wheel 2, which running wheel 2 is provided with a diameter D' increased beyond that in the embodiment according to FIG. 31 (compare FIG. 34). Thus, an arrangement arises with a larger diameter running wheel 2 according to FIG. 34, in which longer tappet extension 36 is arranged for acting on lever part 41, and second return spring 42 contacts on shorter tappet extension 35 on the underside.

In particular, lever part 41, rotation blocking engagement part 43, mounting part 45, second return spring 42 and springs 58 and 59, and, additionally, asymmetrically configured tappet part 33 may be advantageously used, more preferably as well, as the essential parts for forming mounting pin 4 and the components for the rotational blocking for both running wheel diameters D and D'.

The previous embodiments function to explain the inventions covered by the application as a whole, which also independently develop the prior art at least through the following combinations of features, whereby two, several, or all of these combinations of features may also be combined, namely:

A form-fit locking device, which is characterized in that first spring 58 is formed by a lever arm 68 of a lever part 41, so that, with the displacement of rotation blocking engagement part 43 into the engagement position, a second spring 59 may be tensioned to move back into the starting position, and that first spring 58 is stronger than second spring 59.

A form-fit locking device, which is characterized in that both first spring 58 and second spring 59 are substantially detensioned in the starting position.

A form-fit locking device, which is characterized in that first spring 58 is designed as a torsion spring.

A form-fit locking device, which is characterized in that second spring 59 is designed as a torsion spring.

A form-fit locking device, which is characterized in that second spring 59 acts between lever part 41 and a mounting part 45 fixed to the fork.

A form-fit locking device, which is characterized in that first spring 58 and second spring 59 respectively act on one end on lever part 41.

A form-fit locking device, which is characterized in that first spring 58 acts solely between lever part 41 and rotation blocking engagement part 43.

A form-fit locking device, which is characterized in that second spring 59 surrounds a mounting pin 53 of mounting part 45.

A form-fit locking device, which is characterized in that first spring 58 is guided in a groove 65 of lever part 41.

A form-fit locking device, which is characterized in that lever part 41 has two actuating ends 55, 56.

A form-fit locking device, which is characterized in that tappet part 33 is formed in the shape of a fork, with tappet extensions 35, 36 of different lengths, wherein only one tappet extension 35, 36 is arranged to act on lever part 41.

A form-fit locking device, which is characterized in that tappet part 33 is actuatable by a switching tappet 12.

A form-fit locking device, which is characterized in that tappet part 33 interacts with a second return spring 42.

A form-fit locking device, which is characterized in that switching tappet 12 interacts with a first return spring 19.

A form-fit locking device, which is characterized in that second return spring 42 interacts directly only with one of tappet extensions 35, 36 and the other tappet extension 35, 36 is not directly actuated by a return spring.

A form-fit locking device, which is characterized in that longer tappet extension 36 has an access opening 69 for second return spring 42.

All features disclosed are essential to the invention (in themselves, but also in combination with one another). The disclosure the application also includes the disclosure content of the associated/attached priority documents (copy of the previous application) in full, also for the purpose of including features of these documents in the claims of the present application. The subclaims, even without the features of a referenced claim, characterize with their features independent refinements of the prior art according to the invention, in particular for undertaking divisional applications on the basis of these claims. The invention specified in each claim may additionally have one or more of the features specified in the previous description, in particular provided with reference numerals and/or specified in the list of reference numerals. The invention also relates to configurations in which individual features, listed in the previous description, are not implemented, in particular insofar as they are evidently dispensable for the respective intended use or may be replaced by other technically equivalent means.

LIST OF REFERENCE NUMERALS

1 Caster
2 Running wheel
3 Fork
4 Mounting pin
5 Fork shell part
5 Fork shell part
7 Fork leg
8 Fork cavity
9 Hollow axel
10 Switching cam
11 Coupling opening
12 Switching tappet
13 Pivot locking device
14 Form-fit locking device
15 Housing shell
16 Passage
17 Cam part
18 Annular collar
19 First return spring
20 Counter-cam
21 Control surface
22 Control recess
23 Control recess
24 Stop projection
25 Circumferential groove
26 Locking plate
27 Locking formation
28 Directional locking part
29 Bearing
30 Rotation blocking part
31 Rotation blocking projection
31 Extension
33 Tappet part
34 Bridge section
35 Tappet extension
36 Tappet extension
37 Guide projection
38 Guide opening
39 Pin
40 Control surface
41 Lever part
42 Second return spring
43 Rotation blocking engagement part
44 Toothing
45 Mounting part
46 Sliding extension
47 Sliding receptacle
48 Locking tooth
49 Support section
50 Entrainment projection
51 Fastening pin
52 Receptacle opening
53 Mounting pin
54 Pin receptacle
55 First actuating end
56 Second actuating end
57 Stop block
58 First spring
59 Second spring
60 Winding section
61 Spring leg
62 Support bracket
63 Spring leg
64 Spring leg
65 Groove
66 Winding section
67 Spring leg
68 Lever arm
69 Access opening 70 Spring element
a Actuation axis
b Line
C Direction of movement
d Direction of rotation
e Direction of rotation
l Length
l' Length
r Direction of extension
X Pivot axis
Y Axis of rotation
Z Pivot axis
D Diameter
D' Diameter
α Angle

The invention claimed is:

1. A caster (1) comprising a form-fit locking device (14), a running wheel (2) and a fork (3), wherein the form-fit locking device is attached to the caster, the form-fit locking device comprising:

a rotation blocking engagement part (43) configured for rotationally blocking the running wheel (2) of the caster (1) in relation to a geometric running wheel axis (y), wherein the rotation blocking engagement part (43) is movable from a starting position into an engagement position, and wherein the rotation blocking engagement part (43) is form-fittingly connected to the running wheel (2) in such a way that in the engagement position the running wheel (2) is rotationally blocked, and in the starting position the running wheel (2) is freely rotatable, a first spring (58) that acts on the rotation blocking engagement part (43) and is configured for displacing the rotation blocking engagement part (43) from the starting position into the engagement position, wherein the first spring (58) is mounted on a pivotable lever part (41), and wherein the first spring (58) forms a lever arm (68) which is part of the first spring (58) and is itself correspondingly resilient, and a second spring (59) mounted on the lever part, wherein, with the displacement of the rotation blocking engagement part (43) into the engagement position, the second spring (59) is tensioned for a return movement of the rotation blocking engagement part into the starting position, and wherein the first spring (58) is stronger than the second spring (59).

2. The caster according to claim 1, wherein both the first spring (58) and the second spring (59) are substantially detensioned in the starting position, so that the first spring (58) and the second spring (59) exert no or no significant spring force on the lever part (41) and the rotation blocking engagement part (43).

3. The caster according to claim 1, wherein the first spring (58) is designed as a torsion spring.

4. The caster according to claim 1, wherein the second spring (59) is designed as a torsion spring.

5. The caster according to claim 1, wherein the second spring (59) acts between the lever part (41) and a mounting part (45) fixed to the fork.

6. The caster according to claim 5, wherein the second spring (59) surrounds a mounting pin (53) of the mounting part (45).

7. The caster according to claim 1, wherein the first spring (58) and the second spring (59) respectively act on one end on the lever part (41).

8. The caster according to claim 1, wherein the first spring (58) acts solely between the lever part (41) and the rotation blocking engagement part (43).

9. The caster according to claim 1, wherein the first spring (58) is guided in a groove (65) of the lever part (41).

10. The caster according to claim 1, wherein the lever part (41) has a first actuating end (55), configured to act on the rotation blocking part (43) and a second actuating end (56) configured to interact with a tappet part (33), said tappet part (33) being configured for actuating the form-fit locking device (14).

11. A caster comprising a form-fit locking device (14), a running wheel (2), and a fork (3), wherein the form-fit locking device (14) is attached to the caster (1), the form-fit locking device comprising:

a rotation blocking engagement part (43) configured for rotationally blocking the running wheel (2) of the caster (1) with respect to a geometric running wheel axis (y), wherein the rotation blocking engagement part (43) is movable from a starting position into an engagement position, and wherein the rotation blocking engagement part (43) is form-fittingly connected to the running wheel (2) in such a way that in the engagement position the running wheel (2) is rotationally blocked and in the starting position the running wheel (2) is freely rotatable, a lever part (41) configured for displacing the rotation blocking engagement part (43) from the starting position into the engagement position and/or from the engagement position into the starting position, wherein additionally the lever part is actuatable by means of a tappet part (33), wherein the tappet part (33) is formed in the shape of a fork, with tappet extensions (35, 36) of different lengths, wherein only one tappet extension (35, 36) is arranged to act on the lever part (41), wherein, in an operation state of the caster (1), the tappet extensions (35, 36) extend substantially in a vertical direction, and wherein the tappet extensions (35, 36) extend on both sides and along a mounting pin axis of a mounting pin (4) of the caster which defines a geometric pivot axis (x) of the caster (1), and wherein the fork (3) is pivotable around the pivot axis (x).

12. The caster according to claim 11, wherein the tappet part (33) is actuatable by a switching tappet (12).

13. The caster according to claim 12, wherein the switching tappet (12) interacts with a first return spring (19).

14. The caster according to claim 11, wherein the tappet part (33) interacts with a return spring (42).

15. The caster according to claim 14, wherein the return spring (42) interacts directly only with one of the tappet extensions (35, 36) and the other tappet extension (35, 36) is not directly actuated by the return spring.

16. The caster according to claim 15, wherein the longer tappet extension (36) has an access opening (69) for the return spring (42).

17. The caster according to claim 11, wherein the tappet part (33) is U-shaped and comprises a crossbar and two opposite ends, wherein the tappet extensions (35, 36) extend from the opposite ends of the crossbar, wherein the mounting pin axis passes through the crossbar of the tappet part (33) substantially in the center.

* * * * *